United States Patent
Ma et al.

(10) Patent No.: US 9,332,503 B2
(45) Date of Patent: May 3, 2016

(54) METHOD FOR CONTROLLING POWER OF UPLINK MULTIPLE-INPUT MULTIPLE-OUTPUT CHANNEL, AND USER EQUIPMENT

(71) Applicant: HUAWEI TECHNOLOGIES CO., LTD., Shenzhen (CN)

(72) Inventors: Xueli Ma, Shanghai (CN); Huan Zhou, Shenzhen (CN); Bo Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 14/135,957

(22) Filed: Dec. 20, 2013

(65) Prior Publication Data

US 2014/0141831 A1  May 22, 2014

Related U.S. Application Data

(63) Continuation of application No. PCT/CN2012/077337, filed on Jun. 21, 2012.

(30) Foreign Application Priority Data

Jun. 23, 2011 (CN) .......................... 2011 1 0171622

(51) Int. Cl.
*H04B 7/00* (2006.01)
*H04B 1/00* (2006.01)
(Continued)

(52) U.S. Cl.
CPC ........... *H04W 52/146* (2013.01); *H04B 7/0413* (2013.01); *H04W 52/367* (2013.01); *H04W 52/44* (2013.01); *H04W 52/42* (2013.01); *Y02B 60/50* (2013.01)

(58) Field of Classification Search
CPC ............................... H04W 52/14; H04W 4/00
USPC ...................... 455/522, 69, 127.1, 53.1, 67.13
See application file for complete search history.

(56) References Cited

U.S. PATENT DOCUMENTS 8,717,992 B2 * 5/2014 Hamaguchi ........... H04W 52/42
370/318
9,008,050 B2 * 4/2015 Feuersanger ....... H04W 52/281
370/336

(Continued)

FOREIGN PATENT DOCUMENTS

CN     101959238     1/2011
CN     102752836     10/2012

(Continued)

OTHER PUBLICATIONS

PCT International Search Report and Written Opinion of the International Searching Authority dated Sep. 20, 2012 in corresponding International Patent Application No. PCT/CN2012/077337.

(Continued)

*Primary Examiner* — Tilahun B Gesesse
(74) *Attorney, Agent, or Firm* — Staas & Halsey LLP

(57) ABSTRACT

Embodiments of the present invention disclose a method for controlling power of an uplink multiple-input multiple-output channel, and a user equipment that are used to support an uplink MIMO application scenario and implement control of transmit power of a UE. The method in the embodiments of the present invention includes: when total transmit power of a user equipment UE is greater than maximum allowed transmit power, performing, by the UE, power reduction for an uplink multiple-input multiple-output MIMO channel on which a main data transmission block and a secondary data transmission block are sent, so that the total transmit power of the UE after the reduction is less than or equal to the maximum allowed transmit power.

12 Claims, 7 Drawing Sheets

(51) Int. Cl.
*H01Q 11/12* (2006.01)
*H04W 52/14* (2009.01)
*H04W 52/36* (2009.01)
*H04W 52/44* (2009.01)
*H04B 7/04* (2006.01)
*H04W 52/42* (2009.01)

(56) References Cited

U.S. PATENT DOCUMENTS

| | | | | |
|---|---|---|---|---|
| 2004/0171385 A1* | 9/2004 | Haustein | ............ | H04B 7/0413 455/450 |
| 2005/0281348 A1 | 12/2005 | Kim | | |
| 2009/0069057 A1* | 3/2009 | Haartsen | ............ | H04W 72/085 455/574 |
| 2009/0227278 A1* | 9/2009 | Cho | ............ | H04L 1/0026 455/522 |
| 2010/0246463 A1* | 9/2010 | Papasakellariou | .. | H04W 52/146 370/311 |
| 2010/0246561 A1* | 9/2010 | Shin | ............ | H04W 52/32 370/345 |
| 2010/0246705 A1* | 9/2010 | Shin | ............ | H04W 52/42 375/267 |
| 2010/0273520 A1* | 10/2010 | Pelletier | ............ | H04L 5/0007 455/522 |
| 2010/0290548 A1 | 11/2010 | Hoshino et al. | | |
| 2011/0105174 A1* | 5/2011 | Pelletier | ............ | H04W 52/367 455/522 |
| 2012/0039327 A1 | 2/2012 | Yang et al. | | |
| 2012/0120895 A1 | 5/2012 | Wang et al. | | |
| 2013/0021915 A1* | 1/2013 | Catovic | ............ | H04W 52/286 370/241 |
| 2013/0058315 A1* | 3/2013 | Feuersanger | ....... | H04W 52/281 370/336 |
| 2014/0177601 A1* | 6/2014 | Nishio | ............ | H04W 24/10 370/332 |
| 2014/0349701 A1* | 11/2014 | Vajapeyam | ............ | H04W 52/32 455/522 |
| 2015/0111608 A1* | 4/2015 | Kazmi | ............ | H04W 52/18 455/522 |

FOREIGN PATENT DOCUMENTS

| | | |
|---|---|---|
| WO | 2009/081514 | 7/2009 |
| WO | 2010/124433 | 11/2010 |
| WO | 2011/041719 | 4/2011 |
| WO | 2013/119938 | 8/2013 |

OTHER PUBLICATIONS

Extended European Search Report dated Apr. 4, 2014 in corresponding European Patent Application No. 12802926.1.
"Power scaling for CLTD", Ericsson, ST-Ericsson, 5.2.5, 3GPP TSG RAN WG1 Meeting #65, Barcelona, Spain, May 2011, 4pp.
"3rd Generation Partnership Project; Technical Specification Group Radio Access Network; Physical layer procedures (FDD) (Release 10)", 3GPP TS 25.214 V10.3.0, Jun. 2011, pp. 1-100.
International Search Report mailed on Sep. 20, 2012 in corresponding International Application No. PCT/CN2012/077337.

* cited by examiner

METHOD FOR CONTROLLING POWER OF UPLINK MULTIPLE-INPUT MULTIPLE-OUTPUT CHANNEL, AND USER EQUIPMENT

CROSS-REFERENCE TO RELATED APPLICATION

This application is a continuation of International Application No. PCT/CN2012/077337, filed on Jun. 21, 2012, which claims priority to Chinese Patent Application No. 201110171622.7, filed on Jun. 23, 2011, both of which are hereby incorporated by reference in their entireties.

TECHNICAL FIELD

The present invention relates to the field of wireless communications technologies, and in particular, to a method for controlling power of an uplink multiple-input multiple-output channel, and a user equipment.

BACKGROUND

With rapid development of communications technologies, Wideband Code Division Multiple Access (WCDMA, Wideband Code Division Multiple Access), which is one of the mainstream technologies of a third generation mobile communications system, is widely studied and used on a global scale. The current WCDMA has multiple versions, such as a release 99 version (R99, Release99), a release 4 version (R4, Release4), a release 5 version (R5, Release5), a release 6 version (R6, Release6), and a release 7 version (R7, Release7).

To improve a data transmission rate and meet different requirements, the WCDMA introduces a high speed uplink packet access (HSUPA, High Speed Uplink Packet Access) technology in the R6 version, thereby improving a transmission speed of an uplink link. The current HSUPA technologies are carried on a single frequency, that is, single-carrier data transmission.

To further improve a data transmission rate of the HSUPA system, the WCDMA introduces an uplink MIMO (Multiple-Input Multiple-Output, multiple-input multiple-output) technology in an R11 version. Compared with a system using a single antenna on an uplink, a system using multiple antennas can improve a transmission capability of a channel.

Maximum allowed transmit power of a user equipment (UE, User Equipment) is stipulated in WCDMA-related protocols. The UE needs to keep actual uplink transmit power lower than or equal to the maximum allowed transmit power. A carrier power control method for controlling the actual uplink transmit power of the UE in the prior art is as follows: calculating transmit power required by the UE to send a data transmission block to be sent on a carrier; and if the sum of the transmit power obtained through calculation and power of other uplink channels (that is total transmit power of the UE) exceeds the maximum allowed transmit power, performing power reduction for the carrier so that the transmit power of the UE is less than or equal to the maximum allowed transmit power. However, because only one data transmission block to be sent on the carrier is supported, the prior art cannot be applied to an uplink MIMO scenario and power control of the uplink MIMO cannot be implemented.

SUMMARY

Embodiments of the present invention provide a method for controlling power of an uplink multiple-input multiple-output channel, and a user equipment that are used to support an uplink MIMO application scenario and implement control of transmit power of a UE.

A method for controlling power of an uplink multiple-input multiple-output channel provided in an embodiment of the present invention includes:

when total transmit power of a UE is greater than maximum allowed transmit power, performing, by the UE, power reduction for an uplink MIMO channel on which a main data transmission block and a secondary data transmission block are sent, so that the total transmit power of the UE after the reduction is less than or equal to the maximum allowed transmit power.

A user equipment provided in an embodiment of the present invention includes:

a power reduction unit, configured to: when total transmit power of a UE is greater than maximum allowed transmit power, perform power reduction for an uplink MIMO channel on which a main data transmission block and a secondary data transmission block are sent, so that the total transmit power of the UE after the reduction is less than or equal to the maximum allowed transmit power.

It can be seen from the above technical solutions that embodiments of the present invention have the following advantages:

In the embodiments of the present invention, when total transmit power of a UE is greater than maximum allowed transmit power, the UE performs power reduction for an uplink MIMO channel on which a main data transmission block and a secondary data transmission block are sent, so that the total transmit power after the reduction is less than or equal to the maximum allowed transmit power, thereby supporting an uplink MIMO application scenario and implementing control of the transmit power of the UE.

DESCRIPTION OF EMBODIMENTS

Embodiments of the present invention provide a method for controlling power of an uplink multiple-input multiple-output channel, and a user equipment that are used to support an uplink MIMO application scenario and implement control of transmit power of a UE.

To make the invention objectives, features, and advantages of the present invention more obvious and comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention shall fall within the protection scope of the present invention.

A maximum allowed transmit power of a UE is stipulated in WCDMA-related protocols. The UE needs to keep total transmit power lower than or equal to the maximum allowed transmit power. The maximum allowed transmit power is defined as a smaller one between maximum output power determined by a UE power degree and maximum allowed uplink transmit power configured in a system. When an uplink is configured with a MIMO channel and the UE power is limited, the total transmit power of the UE is shared by two data streams of a main data transmission block and a secondary data transmission block. Therefore, this embodiment of the present invention proposes that when the UE is configured as the uplink MIMO channel, power reduction be performed for the uplink MIMO channel on which the main data transmission block and the secondary data transmission block are sent, so as to solve the problem that the maximum allowed transmit power is exceeded when the UE power is limited. In subsequent embodiments of the present invention, a detailed description of power reduction for the main data transmission block and the secondary data transmission block is provided.

Figure 1:
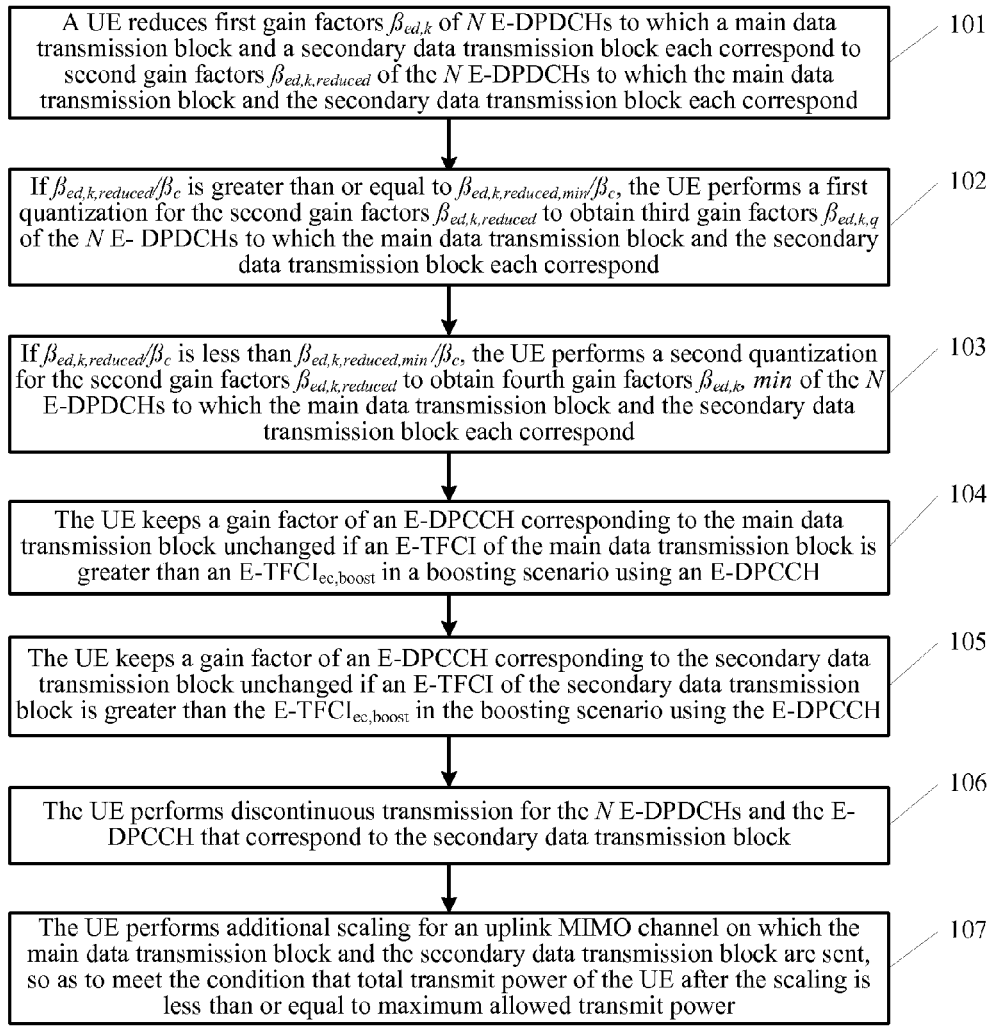
FIG. 1 is a schematic diagram of a method for controlling power of an uplink multiple-input multiple-output channel according to an embodiment of the present invention.

The following describes a method for controlling power of an uplink multiple-input multiple-output channel provided in an embodiment of the present invention by using a specific embodiment. As shown in FIG. 1, the method includes:

101. A UE reduces first gain factors $\beta_{ed,k}$ of N enhanced dedicated channel dedicated physical data channels E-DPDCHs to which a main data transmission block and a secondary data transmission block each correspond to second gain factors $\beta_{ed,k,reduced}$ of the N E-DPDCHs to which the main data transmission block and the secondary data transmission block each correspond.

Figure 2:
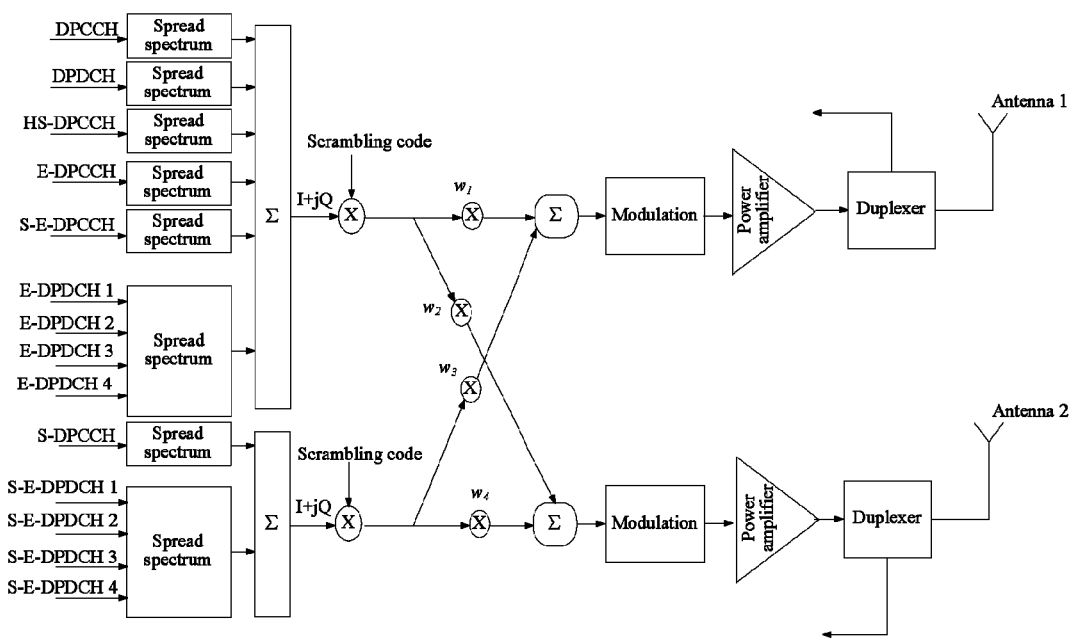
FIG. 2 is a schematic diagram of a WCDMA system configured with uplink MIMO on which two data transmission blocks are sent according to an embodiment of the present invention.

When total transmit power of the UE is greater than maximum allowed transmit power, the UE may perform power reductionreduction for the main data transmission block and the secondary data transmission block simultaneously. FIG. 2 is a schematic diagram of uplink MIMO on which two data transmission blocks are sent, that is, the main data transmission block and the secondary data transmission block. The uplink MIMO channel includes: a dedicated physical control channel (DPCCH, Dedicated Physical Control Channel); a dedicated physical data channel (DPDCH, Dedicated Physical Data Channel); a dedicated physical control channel for high speed downlink shared channel (HS-DPCCH, Dedicated Physical Control Channel (uplink) for High Speed Downlink Shared Channel); four enhanced dedicated channel dedicated physical data channels (E-DPDCH, Enhanced Dedicated Channel Dedicated Physical Data Channel) for the main data transmission block, including E-DPDCH 1, E-DPDCH 2, E-DPDCH 3, and E-DPDCH 4; an enhanced dedicated channel dedicated physical control channel (E-DPCCH, Enhanced Dedicated Channel Dedicated Physical Control Channel) corresponding to the main data transmission block; enhanced dedicated channel dedicated physical data channels E-DPDCHs (they may be described as S-E-DPDCHs for distinction from the main data transmission block), including S-E-DPDCH 1, S-E-DPDCH 2, S-E-DPDCH 3, and S-E-DPDCH 4, a secondary dedicated physical control channel DPCCH (S-DPCCH, Second Dedicated Physical Control Channel), and an enhanced dedicated channel dedicated physical control channel E-DPCCH corresponding to the secondary data transmission block (it may be described as an S-E-DPCCH for distinction from the main data transmission block). It should be noted that four E-DPDCHs for the main data transmission block and four E-DPDCHs for the secondary data transmission block exist in FIG. 2. However, in a practical application, E-DPDCHs of another number may be set and will not be limited herein.

In this step, the UE may perform power reduction for N E-DPDCHs of the main data transmission block and N E-DPDCHs of the secondary data transmission block simultaneously. The UE reduces the first gain factors $\beta_{ed,k}$ of the N E-DPDCHs to which the main data transmission block and the secondary data transmission block each correspond to the second gain factors $\beta_{ed,k,reduced}$ of the N E-DPDCHs to which the main data transmission block and the secondary data transmission block each correspond, so as to meet the condition that the total transmit power of the UE after the reduction is less than or equal to the maximum allowed transmit power. For example, as shown in FIG. 2, the first gain factors $\beta_{ed,k}$ of E-DPDCH 1, E-DPDCH 2, E-DPDCH 3, and E-DPDCH 4 of the main data transmission block and S-E-DPDCH 1, S-E-DPDCH 2, S-E-DPDCH 3, and S-E-DPDCH 4 of the secondary data transmission block may be reduced to the second gain factors $\beta_{ed,k,reduced}$, so as to meet the condition that the total transmit power of the UE after the reduction is less than or equal to the maximum allowed transmit power.

102. If $\beta_{ed,k,reduced}/\beta_c$ is greater than or equal to $\beta_{ed,k,reduced,min}/\beta_c$, the UE performs a first quantization for the second gain factors $\beta_{ed,k,reduced}$ to obtain third gain factors $\beta_{ed,k,q}$ of the N E-DPDCHs to which the main data transmission block and the secondary data transmission block each correspond.

$\beta_{ed,k,reduced,min}$ is a minimum value of gain factors of the N E-DPDCHs configured by a network side, where k={1, ..., N}. In this embodiment of the present invention, the UE determines a value relationship of $\beta_{ed,k,reduced}/\beta_c$ and $\beta_{ed,k,reduced,min}/\beta_c$. When $\beta_{ed,k,reduced}/\beta_c$ is greater than or equal to $\beta_{ed,k,reduced,min}/\beta_c$, the UE performs the first quantization for the second gain factors $\beta_{ed,k,reduced}$ to obtain the third gain factors $\beta_{ed,k,q}$ of the N E-DPDCHs to which the main data transmission block and the secondary data transmission block each correspond.

103. If $\beta_{ed,k,reduced}/\beta_c$ is less than $\beta_{ed,k,reduced,min}/\beta_c$, the UE performs a second quantization for the second gain factors $\beta_{ed,k,reduced}$ to obtain fourth gain factors $\beta_{ed,k,min}$ of the N E-DPDCHs to which the main data transmission block and the secondary data transmission block each correspond.

$\beta_c$ is a gain factor of the DPCCH, $\beta_{ed,k,min}/\beta_c$=min ($\beta_{ed,k,reduced,min}/\beta_c$, $\beta_{ed,k,original}/\beta_c$), $\beta_{ed,k,original}$ indicates gain factors of the N E-DPDCHs to which the main data transmission block and the secondary data transmission block each correspond before the reduction, $\beta_{ed,k,reduced,min}$ indicates the minimum value of the gain factors of the N E-DPDCHs configured by the network side, and k={1, ..., N}.

It should be noted that in this embodiment of the present invention, 102 and 103 are steps executed according to a value relationship between the second gain factors $\beta_{ed,k,reduced}$ and the minimum value of the gain factors $\beta_{ed,k,reduced,min}$ of the E-DPDCHs configured by the network side, and no sequence is defined.

104. The UE keeps a gain factor of an E-DPCCH corresponding to the main data transmission block unchanged if an enhanced dedicated channel transport format combination indicator E-TFCI of the main data transmission block is greater than an enhanced dedicated channel transport format combination indicator threshold E-TFCI$_{ec,boost}$ in a boosting scenario using the E-DPCCH.

In this embodiment of the present invention, in the boosting (boosting) scenario using the E-DPCCH, if the enhanced dedicated channel transport format combination indicator (E-TFCI, Enhanced Dedicated Channel Transport Format Combination Indicator) of the main data transmission block is greater than the enhanced dedicated channel transport format combination indicator threshold E-TFCI$_{ec,boost}$, the UE reduces only the first gain factors $\beta_{ed,k}$ of the N E-DPDCHs corresponding to the main data transmission block to the second gain factors $\beta_{ed,k,reduced}$ of the N E-DPDCHs corresponding to the main data transmission block, so as to meet the condition that the total transmit power of the UE after the reduction is less than or equal to the maximum allowed transmit power, but neither reduces the gain factor of the E-DPCCH corresponding to the main data transmission block nor recalculates the gain factor of the E-DPCCH according to the scaled E-DPDCHs.

105. The UE keeps a gain factor of an E-DPCCH corresponding to the secondary data transmission block unchanged if an E-TFCI of the secondary data transmission block is greater than the E-TFCI$_{ec,boost}$ in the boosting scenario using the E-DPCCH.

By using a same method for processing the E-DPCCH corresponding to the main data transmission block in 104, the UE keeps the gain factor of the E-DPCCH corresponding to the secondary data transmission block unchanged in the boosting scenario using the E-DPCCH.

It should be noted that no sequence is defined for 104 and 105 and it may be as follows: 105 is executed after 104, 104 is executed after 105, or 104 and 105 are executed simultaneously. This is not limited herein.

106. The UE performs discontinuous transmission for the N E-DPDCHs and the E-DPCCH that correspond to the secondary data transmission block.

In this embodiment of the present invention, after the power reduction performed by the UE in 101 to 105, if the total transmit power of the UE is still greater than the maximum allowed transmit power, the UE reduces the gain factors of the N E-DPDCHs and the E-DPCCH that correspond to the secondary data transmission block to zero and the UE performs discontinuous transmission (DTX, discontinued transmission) for the N E-DPDCHs and the E-DPCCH that correspond to the secondary data transmission block.

107. The UE performs additional scaling for the uplink MIMO channel on which the main data transmission block and the secondary data transmission block are sent, so as to meet the condition that the total transmit power of the UE after the reduction is less than or equal to the maximum allowed transmit power.

In this embodiment of the present invention, after the power reduction in 106, if the total transmit power of the UE is still greater than the maximum allowed transmit power, the UE may perform additional scaling (additional scaling) for the uplink MIMO channel on which the main data transmission block and the secondary data transmission block are sent, so as to meet the condition that the total transmit power of the UE after the reduction is less than or equal to the maximum allowed transmit power.

In this embodiment of the present invention, the performing, by the UE, additional scaling for the uplink MIMO channel on which the main data transmission block and the secondary data transmission block are sent, includes: reducing, by the UE, the gain factor of the DPCCH, keeping a power ratio between the DPCCH and the HS-DPCCH unchanged, keeping a power ratio between the DPCCH and the E-DPCCH that corresponds to the main data transmission block unchanged, keeping a power ratio between the DPCCH and the secondary dedicated physical control channel S-DPCCH unchanged, and keeping ratios $\beta_{ed,k,min}/\beta_c$ between each of the N E-DPDCHs corresponding to the main data transmission block and the DPCCH unchanged, where $k=\{1, \ldots, N\}$. The following takes keeping the power ratio between the DPCCH and the E-DPCCH that corresponds to the main data transmission block unchanged as an example for description. The UE reduces the total transmit power by reducing the gain factor of the DPCCH. The total transmit power of the UE is the sum of transmit power of all uplink channels, and fixed ratios exist between all the uplink channels and the DPCCH. For example, if the gain factor of the E-DPCCH is expressed as $\beta_{ec}$ and the gain factor of the DPCCH is expressed as $\beta_c$, the power ratio between the E-DPCCH and the DPCCH is kept unchanged in the additional scaling process, that is, $A_j = \beta_{ec}/\beta_c$, reduction of the gain factor $\beta_c$ of the DPCCH indicates that the DPCCH power is reduced and meanwhile, the gain factor $\beta_{ec}$ of the E-DPCCH is accordingly reduced, so as to achieve a purpose of reducing the gain factor of the E-DPCCH. This finally implements reduction of the total transmit power of the UE and meets the condition that the total transmit power after the reduction is less than or equal to the maximum allowed transmit power.

In this embodiment of the present invention, when total transmit power of a UE is greater than maximum allowed transmit power, the UE performs power reduction for uplink MIMO on which a main data transmission block and a secondary data transmission block are sent, so that the total transmit power after the reduction is less than or equal to the maximum allowed transmit power, thereby supporting an uplink MIMO application scenario, and implementing control of the transmit power of the UE. In addition, because the main data transmission block and the secondary data transmission block are scaled simultaneously, a certain degree of equity can be ensured and demodulation performance of a receiving end is ensured. Moreover, the secondary data transmission block is preferentially scaled to DTX, which can ensure transmission quality of the main data transmission block.

Figure 3:
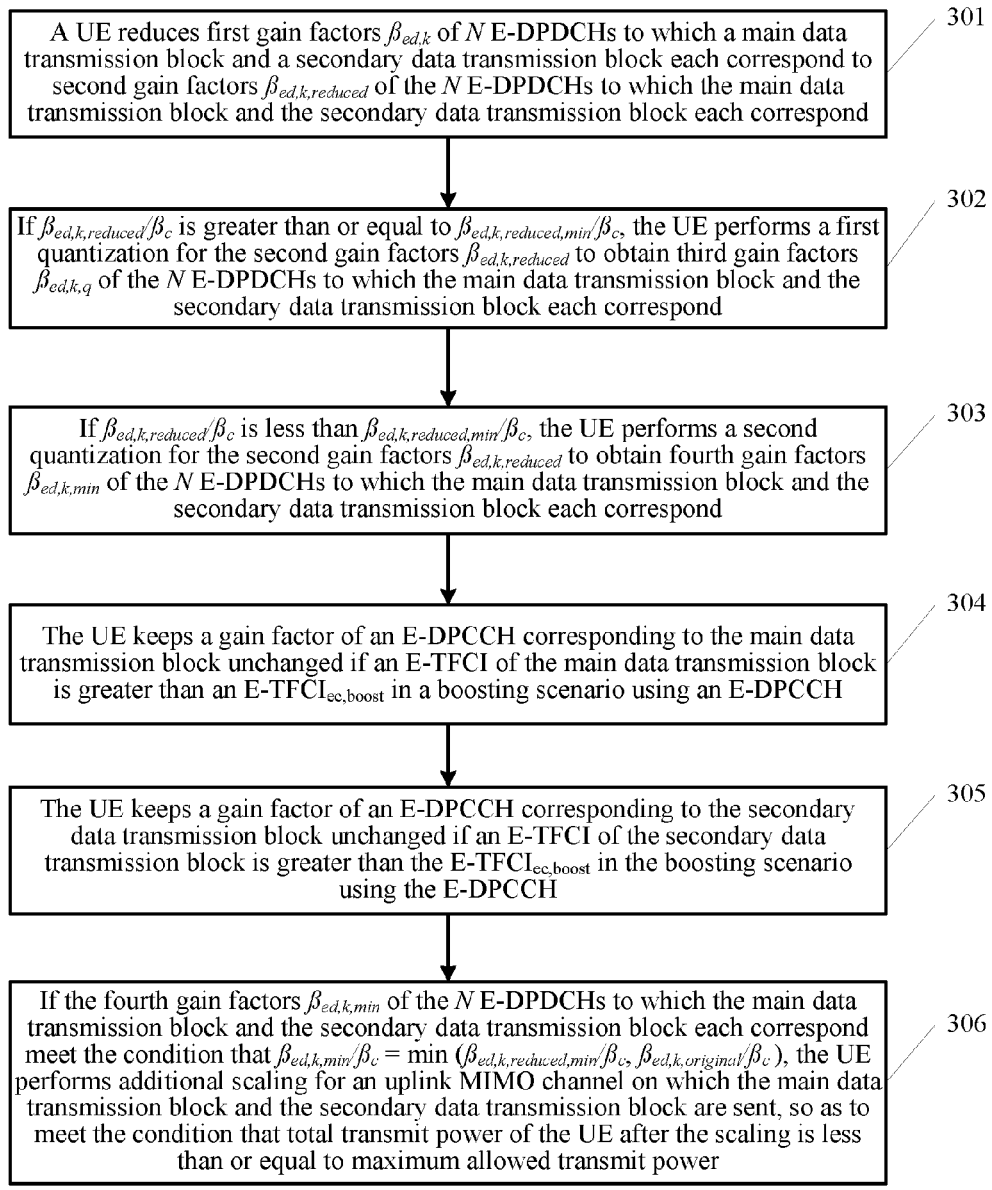
FIG. 3 is a schematic diagram of another method for controlling power of an uplink multiple-input multiple-output channel according to an embodiment of the present invention.

The following describes a method for controlling power of an uplink multiple-input multiple-output channel provided in an embodiment of the present invention by using another specific embodiment. As shown in FIG. 3, the method includes:

Content in 301 to 305 is the same as that in 101 to 105 shown in FIG. 1 and therefore no further details are provided herein.

306. If the fourth gain factors $\beta_{ed,k,min}$ of the N E-DPDCHs to which the main data transmission block and the secondary data transmission block each correspond meet the condition that $\beta_{ed,k,min}/\beta_c = \min(\beta_{ed,k,reduced,min}/\beta_c, \beta_{ed,k,original}/\beta_c)$, the UE performs additional scaling for the uplink MIMO channel on which the main data transmission block and the secondary data transmission block are sent, so as to meet the condition that the total transmit power of the UE after the reduction is less than or equal to the maximum allowed transmit power.

$\beta_c$ is a gain factor of the DPCCH, $\beta_{ed,k,original}$ indicates gain factors of the N E-DPDCHs to which the main data transmission block and the secondary data transmission block each correspond before the scaling, and $\beta_{ed,k,reduced,min}$ indicates a minimum value of gain factors of the N E-DPDCHs configured by a network side.

In this embodiment of the present invention, the performing, by the UE, additional scaling for the uplink MIMO channel on which the main data transmission block and the secondary data transmission block are sent, includes: reducing, by the UE, the gain factor of the DPCCH, keeping a power ratio between the DPCCH and the HS-DPCCH unchanged, keeping a power ratio between the DPCCH and the E-DPCCH that corresponds to the main data transmission block unchanged, keeping a power ratio between the DPCCH and the S-DPCCH unchanged, and keeping power ratios $\beta_{ed,k,min}/\beta_c$ between each of the N E-DPDCHs to which the main data transmission block and the secondary data transmission block each correspond and the DPCCH unchanged, where $k=\{1, \ldots, N\}$.

It should be noted that keeping power ratios $\beta_{ed,k,min}/\beta_c$ between each of the N E-DPDCHs to which the main data transmission block and the secondary data transmission block each correspond and the DPCCH unchanged in 306 is different from keeping power ratios $\beta_{ed,k,min}/\beta_c$ between each of the N E-DPDCHs corresponding to the main data transmission block and the DPCCH unchanged in 107 shown in FIG. 1. Because in 106, the UE performs discontinuous transmission DTX for the N E-DPDCHs and the E-DPCCH that correspond to the secondary data transmission block, a ration between the second gain factors of the N E-DPDCHs corresponding to the secondary data transmission block and $\beta_c$, $\beta_{ed,k,reduced}/\beta_c=0$, at this time the second gain factors of the N E-DPDCHs corresponding to the secondary data transmission block is reduced to 0, and therefore only the power ratios $\beta_{ed,k,min}/\beta_c$ between each of the N E-DPDCHs corresponding to the main data transmission block and the DPCCH need to be kept unchanged in 107. However, in this embodiment shown in FIG. 3, no discontinuous transmission DTX is performed for the N E-DPDCHs corresponding to the secondary data transmission block, and therefore in 306, the power ratios $\beta_{ed,k,min}/\beta_c$ between each of the N E-DPDCHs to which the main data transmission block and the secondary data transmission block each correspond and the DPCCH corresponding to the main data transmission block need to be kept unchanged.

In this embodiment of the present invention, when total transmit power of a UE is greater than maximum allowed transmit power, the UE performs power reduction for an uplink MIMO channel on which a main data transmission block and a secondary data transmission block are sent, so that the total transmit power after the reduction is less than or equal to the maximum allowed transmit power, thereby supporting an uplink MIMO application scenario and implementing control of the transmit power of the UE. In addition, because the main data transmission block and the secondary data transmission block are scaled simultaneously, a certain degree of equity can be ensured.

Figure 4:
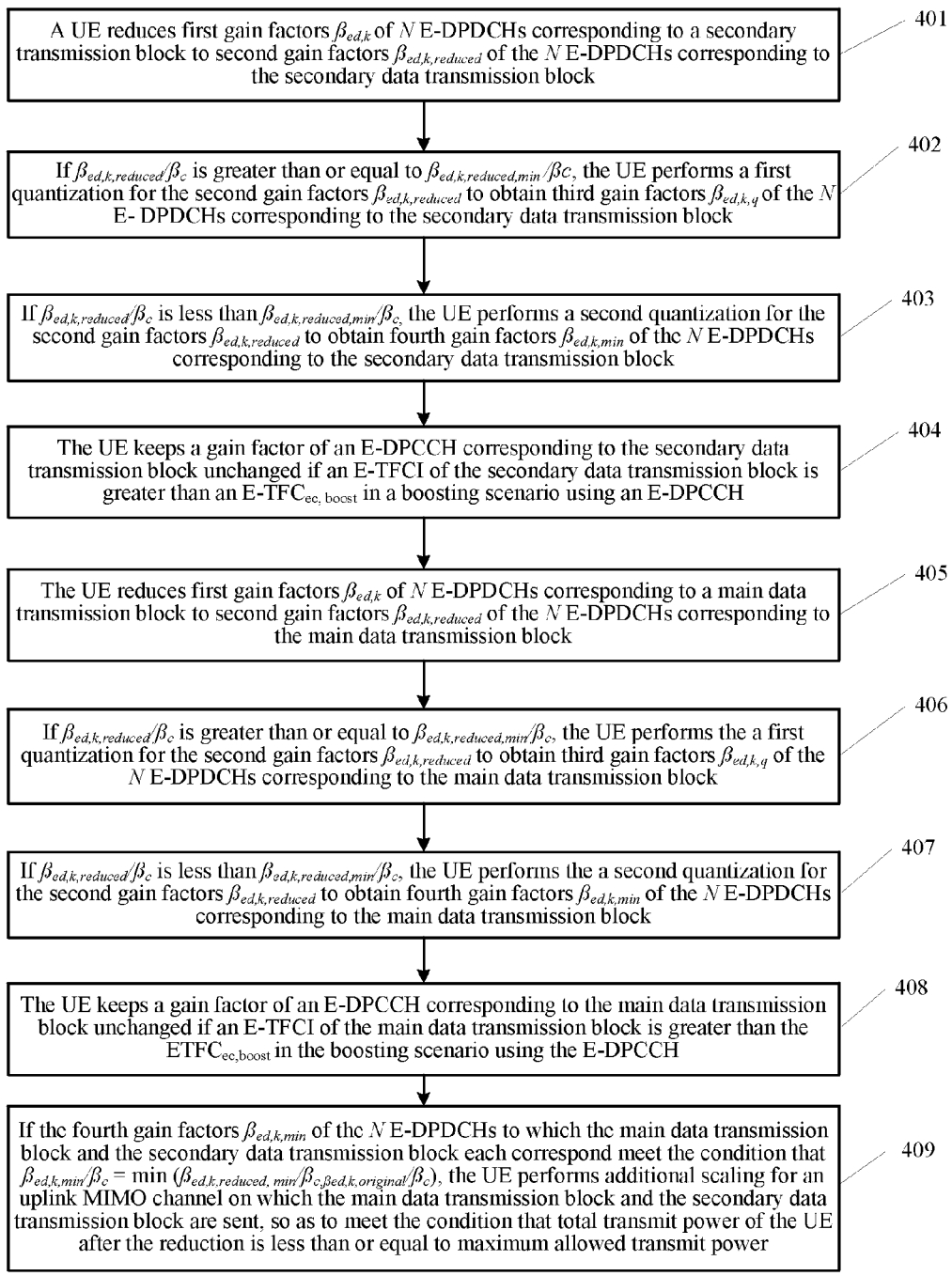
FIG. 4 is a schematic diagram of another method for controlling power of an uplink multiple-input multiple-output channel according to an embodiment of the present invention.

The following describes a method for controlling power of an uplink multiple-input multiple-output channel provided in an embodiment of the present invention by using another specific embodiment. As shown in FIG. 4, the method includes:

401. A UE reduces first gain factors $\beta_{ed,k}$ of N E-DPDCHs corresponding to a secondary data transmission block to second gain factors $\beta_{ed,k,reduced}$ of the N E-DPDCHs corresponding to the secondary data transmission block, so as to meet the condition that total transmit power of the UE after the reduction is less than or equal to maximum allowed transmit power.

When the total transmit power of the UE is greater than the maximum allowed transmit power, the UE first performs power reduction for the secondary data transmission block. FIG. 2 is a schematic diagram of uplink MIMO on which two data transmission blocks are sent, that is, a main data transmission block and the secondary data transmission block. For content of FIG. 2, reference may be made to foregoing description and therefore no further details are provided herein.

In this step, the UE first performs power reduction for the N E-DPDCHs of the secondary data transmission block, that is, reduces the first gain factors $\beta_{ed,k}$ of the N E-DPDCHs corresponding to the secondary data transmission block to the second gain factors $\beta_{ed,k,reduced}$ of the N E-DPDCHs corresponding to the secondary data transmission block, so as to meet the condition that the total transmit power of the UE after the reduction is less than or equal to the maximum allowed transmit power, where $k=\{1, \ldots, N\}$. The reduction of the first gain factors $\beta_{ed,k}$ to the second gain factors $\beta_{ed,k,reduced}$ so that the total transmit power of the UE is less than or equal to the maximum allowed transmit power may be as follows: for example, as shown in FIG. 2, the first gain factors $\beta_{ed,k}$ of S-E-DPDCH 1, S-E-DPDCH 2, S-E-DPDCH 3, and S-E-DPDCH 4 of the secondary data transmission block are reduced to the second gain factors $\beta_{ed,k,reduced}$, so as to meet the condition that the total transmit power of the UE after the reduction is less than or equal to the maximum allowed transmit power.

402. If $\beta_{ed,k,reduced}/\beta_c$ is greater than or equal to $\beta_{ed,k,reduced,min}/\beta_c$, the UE performs first quantization for the second gain factors $\beta_{ed,k,reduced}$ to obtain third gain factors $\beta_{ed,k,q}$ of the N E-DPDCHs corresponding to the secondary data transmission block.

$\beta_{ed,k,reduced,min}$ is a minimum value of gain factors of the N E-DPDCHs configured by a network side, where $k=\{1, \ldots, N\}$. In this embodiment of the present invention, the UE determines a value relationship of $\beta_{ed,k,reduced}/\beta_c$ and $\beta_{ed,k,reduced,min}/\beta_c$. When $\beta_{ed,k,reduced}/\beta_c$ is greater than or equal to $\beta_{ed,k,reduced,min}/\beta_c$, the UE performs the first quantization for the second gain factors $\beta_{ed,k,reduced}$ to obtain the third gain factors $\beta_{ed,k,q}$ of the N E-DPDCHs corresponding to the secondary data transmission block.

403. If $\beta_{ed,k,reduced}/\beta_c$ is less than $\beta_{ed,k,reduced,min}/\beta_c$, the UE performs second quantization for the second gain factors $\beta_{ed,k,reduced}$ to obtain fourth gain factors $\beta_{ed,k,min}$ of the N E-DPDCHs corresponding to the secondary data transmission block.

$\beta_c$ is a gain factor of a DPCCH, $\beta_{ed,k,min}/\beta_c=\min(\beta_{ed,k,reduced,min}/\beta_c, \beta_{ed,k,original}/\beta_c)$, $\beta_{ed,k,original}$ indicates gain factors of the N E-DPDCHs corresponding to the secondary data transmission block before the reduction, $\beta_{ed,k,reduced,min}$ is the minimum value of the gain factors of the N E-DPDCHs configured by the network side, and $k=\{1, \ldots, N\}$.

It should be noted that in this embodiment of the present invention, 402 and 403 are steps executed according to value comparison between the second gain factors $\beta_{ed,k,reduced}$ and the minimum value of the gain factors $\beta_{ed,k,reduced,min}$ of the E-DPDCHs configured by the network side, and no sequence is defined.

404. The UE keeps a gain factor of an E-DPCCH corresponding to the secondary data transmission block unchanged if an E-TFCI of the secondary data transmission block is greater than an $E\text{-}TFCI_{ec,boost}$ in a boosting scenario using the E-DPCCH.

In this embodiment of the present invention, in the boosting scenario using the E-DPCCH, if the enhanced dedicated channel transport format combination indicator E-TFCI of the secondary data transmission block is greater than the enhanced dedicated channel transport format combination indicator threshold E-TFCI$_{ec,boost}$, the UE reduces only the first gain factors $\beta_{ed,k}$ of the N E-DPDCHs corresponding to the secondary data transmission block to the second gain factors $\beta_{ed,k,reduced}$ of the N E-DPDCHs corresponding to the secondary data transmission block, so as to meet the condition that the total transmit power of the UE after the reduction is less than or equal to the maximum allowed transmit power, but neither reduces the gain factor of the E-DPCCH corresponding to the secondary data transmission block nor recalculates the gain factor of the E-DPCCH according to the scaled E-DPDCHs.

405. The UE reduces first gain factors $\beta_{ed,k}$ of N E-DPDCHs corresponding to a main data transmission block to second gain factors $\beta_{ed,k,reduced}$ of the N E-DPDCHs corresponding to the main data transmission block, so as to meet the condition that the total transmit power of the UE after the reduction is less than or equal to the maximum allowed transmit power.

In this embodiment of the present invention, after power reduction for the secondary data transmission block in 401 to 404, if the total transmit power of the UE is greater than the maximum allowed transmit power, the UE performs power reduction for the main data transmission block. FIG. 2 is a schematic diagram of uplink MIMO on which two data transmission blocks are sent, that is, the main data transmission block and the secondary data transmission block. For content of FIG. 2, reference may be made to foregoing description and therefore no further details are provided herein.

In this step, the UE performs power reduction for the N E-DPDCHs of the main data transmission block, that is, reduces the first gain factors $\beta_{ed,k}$ of the N E-DPDCHs corresponding to the main data transmission block to the second gain factors $\beta_{ed,k,reduced}$ of the N E-DPDCHs corresponding to the main data transmission block, so as to meet the condition that the total transmit power of the UE after the reduction is less than or equal to the maximum allowed transmit power, where k={1, . . . , N}. The reduction of the first gain factors $\beta_{ed,k}$ to the second gain factors $\beta_{ed,k,reduced}$ so that the total transmit power of the UE is less than or equal to the maximum allowed transmit power may be as follows: for example, as shown in FIG. 2, the first gain factors $\beta_{ed,k}$ of E-DPDCH 1, E-DPDCH 2, E-DPDCH 3, and E-DPDCH 4 of the main data transmission block are reduced to the second gain factors $\beta_{ed,k,reduced}$, so as to meet the condition that the total transmit power of the UE after the reduction is less than or equal to the maximum allowed transmit power.

406. If $\beta_{ed,k,reduced}/\beta_c$ is greater than or equal to $\beta_{ed,k,reduced,min}/\beta_c$, the UE performs the first quantization for the second gain factors $\beta_{ed,k,reduced}$ to obtain third gain factors $\beta_{ed,k,q}$ of the N E-DPDCHs corresponding to the main data transmission block.

$\beta_{ed,k,reduced,min}$ is the minimum value of the N E-DPDCHs configured by the network side, where k={1, . . . , N}. In this embodiment of the present invention, the UE determines a value relationship of $\beta_{ed,k,reduced}/P$ and $\beta_{ed,k,reduced,min}/\beta_c$. When $\beta_{ed,k,reduced}/\beta_c$ is greater than or equal to $\beta_{ed,k,reduced,min}/P$, the UE performs the first quantization for the second gain factors $\beta_{ed,k,reduced}$ to obtain the third gain factors $\beta_{ed,k,q}$ of the N E-DPDCHs corresponding to the main data transmission block.

407. If $\beta_{ed,k,reduced}/\beta_c$ is less than $\beta_{ed,k,reduced,min}/\beta_c$, the UE performs the second quantization for the second gain factors $\beta_{ed,k,reduced}$ to obtain fourth gain factors $\beta_{ed,k,min}$ of the N E-DPDCHs corresponding to the main data transmission block.

$\beta_c$ is the gain factor of the DPCCH, $\beta_{ed,k,min}/\beta_c$=min ($\beta_{ed,k,reduced,min}/\beta_c$, $\beta_{ed,k,original}/\beta_c$), $\beta_{ed,k,original}$ indicates gain factors of the N E-DPDCHs corresponding to the main data transmission block before the reduction, $\beta_{ed,k,reduced,min}$ indicates the minimum value of the gain factors of the N E-DPDCHs configured by the network side, and k={1, . . . , N}.

It should be noted that in this embodiment of the present invention, 406 and 407 are steps executed according to value comparison between the second gain factors $\beta_{ed,k,reduced}$ and the minimum value of the gain factors $\beta_{ed,k,reduced,min}$ of the E-DPDCHs configured by the network side, and no sequence is defined.

408. The UE keeps a gain factor of an E-DPCCH corresponding to the main data transmission block unchanged if an E-TFCI of the main data transmission block is greater than the E-TFCI$_{ec,boost}$ in the boosting scenario using the E-DPCCH.

In this embodiment of the present invention, in the boosting scenario using the E-DPCCH, if the enhanced dedicated channel transport format combination indicator E-TFCI of the main data transmission block is greater than the enhanced dedicated channel transport format combination indicator threshold E-TFCI$_{ec,boost}$, the UE reduces only the first gain factors $\beta_{ed,k}$ of the N E-DPDCHs corresponding to the main data transmission block to the second gain factors $\beta_{ed,k,reduced}$ of the N E-DPDCHs corresponding to the main data transmission block, so as to meet the condition that the total transmit power of the UE after the reduction is less than or equal to the maximum allowed transmit power, but neither reduces the gain factor of the E-DPCCH corresponding to the main data transmission block nor recalculates the gain factor of the E-DPCCH according to the scaled E-DPDCHs.

409. If all the fourth gain factors $\beta_{ed,k,min}$ of the N E-DPDCHs to which the main data transmission block and the secondary data transmission block each correspond meet the condition that $\beta_{ed,k,min}/\beta_c$=min ($\beta_{ed,k,reduced,min}/\beta_c$, $\beta_{ed,k,original}/\beta_c$), the UE performs additional scaling for the uplink MIMO channel on which the main data transmission block and the secondary data transmission block are sent, so as to meet the condition that the total transmit power of the UE after the reduction is less than or equal to the maximum allowed transmit power.

$\beta_c$ is the gain factor of the DPCCH, $\beta_{ed,k,original}$ indicates the gain factors of the N E-DPDCHs to which the main data transmission block and the secondary data transmission block each correspond before the reduction, $\beta_{ed,k,reduced,min}$ indicates the minimum value of the gain factors of the N E-DPDCHs configured by the network side, and k={1, . . . , N}.

In this embodiment of the present invention, the performing, by the UE, additional scaling for the uplink MIMO channel on which the main data transmission block and the secondary data transmission block are sent, includes: reducing, by the UE, the gain factor of the DPCCH, keeping a power ratio between the DPCCH and the HS-DPCCH unchanged, keeping a power ratio between the DPCCH and the E-DPCCH that corresponds to the main data transmission block unchanged, keeping a power ratio between the DPCCH and the S-DPCCH unchanged, and keeping the power ratios $\beta_{ed,k,min}/\beta_c$ between each of the N E-DPDCHs to which the main data transmission block and the secondary data transmission block each correspond and the DPCCH unchanged, where k={1, . . . , N}.

In this embodiment of the present invention, when total transmit power of a UE is greater than maximum allowed transmit power, the UE performs power reduction for an uplink MIMO channel on which a secondary data transmission block and a main data transmission block are sent, so that the total transmit power after the reduction is less than or equal to the maximum allowed transmit power, thereby supporting an uplink MIMO application scenario and implementing control of the transmit power of the UE. In addition, because power reduction is first performed for the secondary data transmission block, normal sending performance of the main data transmission block can be ensured.

Figure 5:
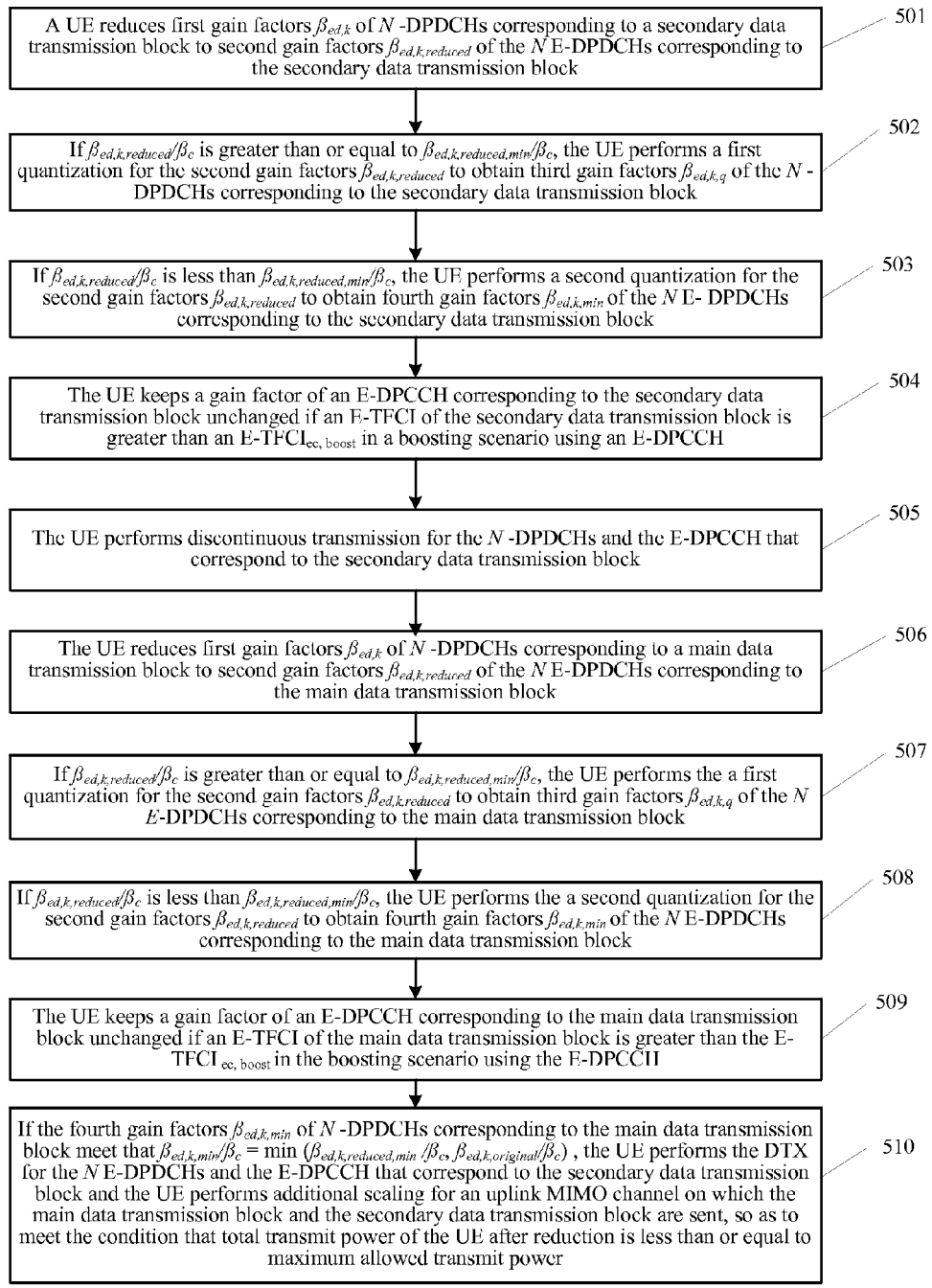
FIG. 5 is a schematic diagram of another method for controlling power of an uplink multiple-input multiple-output channel according to an embodiment of the present invention.

The following describes a method for controlling power of an uplink multiple-input multiple-output channel provided in an embodiment of the present invention by using another specific embodiment. As shown in FIG. 5, the method includes:

Content in 501 to 504 is the same as that in 401 to 404 shown in FIG. 4 and therefore no further details are provided herein.

505. The UE performs discontinuous transmission for the N E-DPDCHs and the E-DPCCH that correspond to the secondary data transmission block.

In this embodiment of the present invention, after power reduction performed by the UE for the secondary data transmission block in 501 to 504, if the total transmit power of the UE is still greater than the maximum allowed transmit power, the UE reduces gain factors of the N E-DPDCHs and the E-DPCCH that correspond to the secondary data transmission block to zero, and the UE performs discontinuous transmission for the N E-DPDCHs and the E-DPCCH that correspond to the secondary data transmission block. At this time, a ration between the second gain factors of the N E-DPDCHs corresponding to the secondary data transmission block and $\beta_c$, $\beta_{ed,k,reduced}/\beta_c=0$.

506. The UE reduces first gain factors $\beta_{ed,k}$ of N E-DPDCHs corresponding to a main data transmission block to second gain factors $\beta_{ed,k,reduced}$ of the N E-DPDCHs corresponding to the main data transmission block, so as to meet the condition that the total transmit power of the UE after the reduction is less than or equal to maximum allowed transmit power.

In this embodiment of the present invention, after power reduction for the secondary data transmission block in 501 to 505, if the total transmit power of the UE is greater than the maximum allowed transmit power, the UE performs power reduction for the main data transmission block. FIG. 2 is a schematic diagram of uplink MIMO on which two data transmission blocks are sent, that is, the main data transmission block and the secondary data transmission block. For content of FIG. 2, reference may be made to foregoing description and therefore no further details are provided herein.

In this step, after performing DTX for the N E-DPDCHs and the E-DPCCH that correspond to the secondary data transmission block, the UE performs power reduction for the N E-DPDCHs of the main data transmission block, that is, reduces the first gain factors $\beta_{ed,k}$ of the N E-DPDCHs corresponding to the main data transmission block to the second gain factors $\beta_{ed,k,reduced}$ of the N E-DPDCHs corresponding to the main data transmission block, so as to meet the condition that the total transmit power of the UE after the reduction is less than or equal to the maximum allowed transmit power, where k={1, ..., N}. The reduction of the first gain factors $\beta_{ed,k}$ to the second gain factors $\beta_{ed,k,reduced}$ so that the total transmit power of the UE is less than or equal to the maximum allowed transmit power may be as follows: for example, as shown in FIG. 2, the first gain factors $\beta_{ed,k}$ of E-DPDCH 1, E-DPDCH 2, E-DPDCH 3, and E-DPDCH 4 of the main data transmission block are reduced to the second gain factors $\beta_{ed,k,reduced}$, so as to meet the condition that the total transmit power of the UE after the reduction is less than or equal to the maximum allowed transmit power.

507. If $\beta_{ed,k,reduced}/\beta_c$ is greater than or equal to $\beta_{ed,k,reduced,min}/\beta_c$, the UE performs the first quantization for the second gain factors $\beta_{ed,k,reduced}$ to obtain third gain factors $\beta_{ed,k,q}$ of the N E-DPDCHs corresponding to the main data transmission block.

$\beta_{ed,k,reduced,min}$ is a minimum value of the N E-DPDCHs configured by a network side, where k={1, ..., N}. In this embodiment of the present invention, the UE determines a value relationship of $\beta_{ed,k,reduced}/\beta_c$ and $\beta_{ed,k,reduced,min}/\beta_c$. When $\beta_{ed,k,reduced}/\beta_c$ is greater than or equal to $\beta_{ed,k,reduced,min}/\beta_c$, the UE performs the first quantization for the second gain factors $\beta_{ed,k,reduced}$ to obtain the third gain factors $\beta_{ed,k,q}$ of the N E-DPDCHs corresponding to the main data transmission block.

508. If $\beta_{ed,k,reduced}/\beta_c$ is less than $\beta_{ed,k,reduced,min}/\beta_c$, the UE performs the second quantization for the second gain factors $\beta_{ed,k,reduced}$ to obtain fourth gain factors $\beta_{ed,k,min}$ of the N E-DPDCHs corresponding to the main data transmission block.

$\beta_c$ is a gain factor of a DPCCH, $\beta_{ed,k,min}/\beta_c=\min(\beta_{ed,k,reduced,min}/\beta_c, \beta_{ed,k,original}/\beta_c)$, $\beta_{ed,k,original}$ indicates gain factors of the N E-DPDCHs corresponding to the main data transmission block before the reduction, $\beta_{ed,k,reduced,min}$ indicates the minimum value of the gain factors of the N E-DPDCHs configured by the network side, and k={1, ..., N}.

It should be noted that in this embodiment of the present invention, 507 and 508 are steps executed according to value comparison between the second gain factors $\beta_{ed,k,reduced}$ and the minimum value of the gain factors $\beta_{ed,k,reduced,min}$ of the E-DPDCHs configured by the network side, and no sequence is defined.

509. The UE keeps a gain factor of an E-DPCCH corresponding to the main data transmission block unchanged if an E-TFCI of the main data transmission block is greater than the E-TFCI$_{ec,boost}$ in the boosting scenario using the E-DPCCH.

In this embodiment of the present invention, in the boosting scenario using the E-DPCCH, if the E-TFCI of the main data transmission block is greater than the E-TFCI$_{ec,boost}$, the UE reduces only the first gain factors $\beta_{ed,k}$ of the N E-DPDCHs corresponding to the main data transmission block to the second gain factors $\beta_{ed,k,reduced}$ of the N E-DPDCHs corresponding to the main data transmission block, so as to meet the condition that the total transmit power of the UE after the reduction is less than or equal to the maximum allowed transmit power, but neither reduces the gain factor of the E-DPCCH corresponding to the main data transmission block nor recalculates the gain factor of the E-DPCCH according to the scaled E-DPDCH.

In this embodiment of the present invention, after power reduction for the secondary data transmission block in 501 to 505, if the total transmit power of the UE is still greater than the maximum allowed transmit power, the UE performs the power reduction for the main data transmission block. For details, reference may be made to 506 to 509.

510. If the fourth gain factors $\beta_{ed,k,min}$ of N E-DPDCHs corresponding to the main data transmission block meet the condition that $\beta_{ed,k,min}/\beta_c=\min(\beta_{ed,k,reduced,min}/\beta_c, \beta_{ed,k,original}/\beta_c)$, the UE performs the DTX for the N E-DPDCHs and the E-DPCCH that correspond to the secondary data transmission block, and the UE performs additional scaling for the uplink MIMO channel on which the main data transmission block and the secondary data transmission block are sent, so as to meet the condition that the total transmit power of the UE after the reduction is less than or equal to the maximum allowed transmit power.

$\beta_c$ is the gain factor of the DPCCH, $\beta_{ed,k,original}$ indicates the gain factors of the N E-DPDCHs corresponding to the main data transmission block before the reduction, $\beta_{ed,k,reduced,min}$ is the minimum value of the gain factors of the N E-DPDCHs configured by the network side, and k={1, ..., N}.

In this embodiment of the present invention, after the power reduction in 501 to 509, if the total transmit power of the UE is still greater than the maximum allowed transmit power, the UE may perform additional scaling (additional scaling) for the uplink MIMO channel on which the main data transmission block and the secondary data transmission block are sent, so as to meet the condition that the total transmit power of the UE after the reduction is less than or equal to the maximum allowed transmit power.

In this embodiment of the present invention, the performing, by the UE, additional scaling for uplink MIMO on which the main data transmission block and the secondary data transmission block are sent, includes: reducing, by the UE, the gain factor of the DPCCH, keeping a power ratio between the DPCCH and the HS-DPCCH unchanged, keeping a power ratio between the DPCCH and the E-DPCCH that corresponds to the main data transmission block unchanged, keeping a power ratio between the DPCCH and the S-DPCCH unchanged, and keeping power ratios $\beta_{ed,k,min}/\beta_c$ between each of the N E-DPDCHs corresponding to the main data transmission block and the DPCCH unchanged, where k={1, ..., N}.

The following takes keeping the power ratio between the DPCCH and the E-DPCCH that corresponds to the main data transmission block unchanged as an example for description. The UE reduces the total transmit power by reducing the gain factor of the DPCCH corresponding to the main data transmission block. The total transmit power of the UE is the sum of transmit power of all uplink channels, and a fixed ratio exists between all the uplink channels and the DPCCH. For example, if the gain factor of the E-DPCCH is expressed as $\beta_{ec}$ and the gain factor of the DPCCH is expressed as $\beta_c$, the power ratio between the E-DPCCH and the DPCCH is kept unchanged in the additional scaling process, that is, $A_j=\beta_{ec}/\beta_c$. Reduction of the gain factor $\beta_c$ of the DPCCH indicates that the DPCCH power is reduced and meanwhile, the gain factor $\beta_{ec}$ of the E-DPCCH is accordingly reduced, so as to achieve a purpose of reducing the gain factor of the E-DPCCH. This finally implements reduction of the total transmit power of the UE and meets the condition that the total transmit power after the reduction is less than or equal to the maximum allowed transmit power.

In this embodiment of the present invention, when total transmit power of a UE is greater than maximum allowed transmit power, the UE performs power reduction for an uplink MIMO channel on which a secondary data transmission block and a main data transmission block are sent, so that the total transmit power after the reduction is less than or equal to the maximum allowed transmit power, thereby supporting an uplink MIMO application scenario and implementing control of the transmit power of the UE. In addition, because power reduction is first performed for the secondary data transmission block, normal sending performance of the main data transmission block can be ensured.

The foregoing embodiments describe methods for controlling power of an uplink multiple-input multiple-output channel according to the embodiments of the present invention, and the following describes a user equipment provided in an embodiment of the present invention.

When an uplink is configured with a MIMO channel and the UE power is limited, the total transmit power of the UE is shared by two data streams of a main data transmission block and a secondary data transmission block. Therefore, a user equipment provided in this embodiment of the present invention includes: a power reduction unit, configured to: when the total transmit power of the UE is greater than maximum allowed transmit power, perform power reduction for the uplink MIMO channel on which the main data transmission block and the secondary data transmission block are sent, so as to solve the problem that the maximum allowed transmit power is exceeded when the UE power is limited. In subsequent embodiments of the present invention, a detailed description of the power reduction unit is provided.

Figure 6:
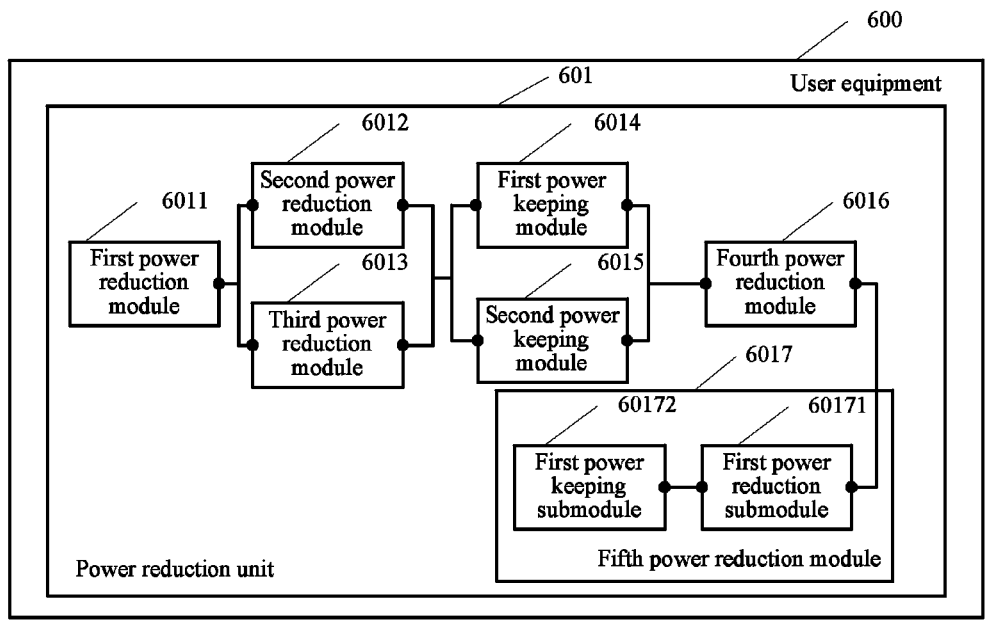
FIG. 6 is a schematic diagram of a user equipment according to an embodiment of the present invention.

The following describes a user equipment provided in an embodiment of the present invention by using a specific embodiment. As shown in FIG. 6, a user equipment 600 includes:

a power reduction unit 601, configured to: when total transmit power of a UE is greater than maximum allowed transmit power, perform power reduction for an uplink MIMO channel on which a main data transmission block and a secondary data transmission block are sent, so that the total transmit power of the UE after the reduction is less than or equal to the maximum allowed transmit power.

The power reduction unit 601 may include:

a first power reduction module 6011, configured to reduce first gain factors $\beta_{ed,k}$ of N E-DPDCHs to which the main data transmission block and the secondary data transmission block each correspond to second gain factors $\beta_{ed,k,reduced}$ of the N E-DPDCHs to which the main data transmission block and the secondary data transmission block each correspond so as to meet the condition that the total transmit power of the UE is less than or equal to the maximum allowed transmit power, where k={1, ..., N};

a second power reduction module 6012, configured to: if $\beta_{ed,k,reduced}/\beta_c$ is greater than or equal to $\beta_{ed,k,reduced,min}/\beta_c$, perform first quantization for the second gain factors $\beta_{ed,k,reduced}$ to obtain third gain factors $\beta_{ed,k,q}$ of the N E-DPDCHs to which the main data transmission block and the secondary data transmission block each correspond, where $\beta_c$ is a gain factor of a DPCCH, $\beta_{ed,k,reduced,min}$ is a minimum value of gain factors of the N E-DPDCHs configured by a network side, and k={1, ..., N}; and a third power reduction module 6013, configured to: if $\beta_{ed,k,reduced}/\beta_c$ is less than $\beta_{ed,k,reduced,min}/\beta_c$, perform second quantization for the second gain factors $\beta_{ed,k,reduced}$ to obtain fourth gain factors $\beta_{ed,k,min}$ of the N E-DPDCHs to which the main data transmission block and the secondary data transmission block each correspond, where $\beta_c$ is the gain factor of the DPCCH, $\beta_{ed,k,min}/\beta_c$=min ($\beta_{ed,k,reduced,min}/\beta_c$, $\beta_{ed,k,original}/\beta_c$), $\beta_{ed,k,original}$ indicates gain factors of the N E-DPDCHs to which the main data transmission block and the secondary data transmission block each correspond before the reduction, $\beta_{ed,k,reduced,min}$ is the minimum value of the gain factors of the N E-DPDCHs configured by the network side, and k={1, ..., N}.

In a boosting scenario using an E-DPCCH, the power reduction unit 601 may further include:

a first power keeping module 6014, configured to keep a gain factor of an E-DPCCH corresponding to the main data transmission block unchanged if an E-TFCI of the main data transmission block is greater than an E-TFCI$_{ec,boost}$ in the boosting scenario using the E-DPCCH; and a second power keeping module 6015, configured to keep a gain factor of an E-DPCCH corresponding to the secondary data transmission block unchanged if an E-TFCI of the secondary data transmission block is greater than the E-TFCI$_{ec,boost}$ in the boosting scenario using the E-DPCCH.

In this embodiment of the present invention, after the power reduction performed by the first power reduction module 6011, the second power reduction module 6012, the third power reduction module 6013, the first power keeping module 6014, and the second power keeping module 6015, if the total transmit power of the UE is still greater than the maximum allowed transmit power, the power reduction unit 601 may further include:

a fourth power reduction module 6016, configured to: after the third power reduction module 6013 performs the second quantization for the second gain factors $\beta_{ed,k,reduced}$ to obtain the fourth gain factors $\beta_{ed,k,min}$ of the N E-DPDCHs to which the main data transmission block and the secondary data transmission block each correspond, perform DTX for the N E-DPDCHs and the E-DPCCH that correspond to the secondary data transmission block.

After the power reduction performed by the fourth power reduction module 6016, if the total transmit power of the UE is still greater than the maximum allowed transmit power, the power reduction unit 601 may further includes:

a fifth power reduction module 6017, configured to: after the fourth power reduction module 6016 performs the DTX for the N E-DPDCHs and the E-DPCCH that correspond to the secondary data transmission block, perform additional scaling for the uplink MIMO channel on which the main data transmission block and the secondary data transmission block are sent, so as to meet the condition that the total transmit power of the UE after the reduction is less than or equal to the maximum allowed transmit power.

The fifth power reduction module 6017 may include:

a first power reduction submodule 60171, configured to reduce the gain factor of the DPCCH; and a first power keeping submodule 60172, configured to keep a power ratio between the DPCCH and an HS-DPCCH unchanged, keep a power ratio between the DPCCH and the E-DPCCH that corresponds to the main data transmission block unchanged, keep a power ratio between the DPCCH and an S-DPCCH unchanged, and keep power ratios $\beta_{ed,k,min}/\beta_c$ between each of N E-DPDCHs corresponding to the main data transmission block and the DPCCH unchanged, where k={1, ..., N}.

The foregoing content describes only composition content and structure relationships of each unit and each module. For details on execution methods of each unit and each module, refer to the embodiment shown in FIG. 1 and no further details are provided herein.

In this embodiment of the present invention, when total transmit power of a UE is greater than maximum allowed transmit power, a power reduction unit 601 performs power reduction for uplink MIMO on which a main data transmission block and a secondary data transmission block are sent, so that the total transmit power after the reduction is less than or equal to the maximum allowed transmit power, thereby supporting an uplink MIMO application scenario and implementing control of the transmit power of the UE. In addition, because the main data transmission block and the secondary data transmission block are reduced simultaneously, a certain degree of equity can be ensured and demodulation performance of a receiving end is ensured. Moreover, the secondary data transmission block is preferentially reduced to DTX, which can ensure transmission quality of the main data transmission block.

Figure 7:
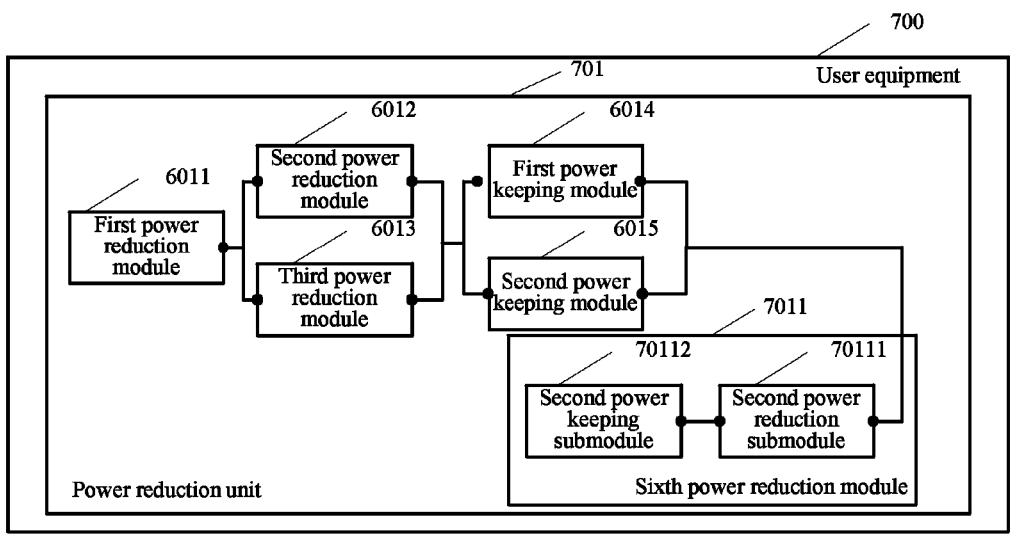
FIG. 7 is a schematic diagram of another user equipment according to an embodiment of the present invention.

The following describes a user equipment provided in an embodiment of the present invention by using another specific embodiment. As shown in FIG. 7, a user equipment 700 includes:

a power reduction unit 701, configured to: when total transmit power of a UE is greater than maximum allowed transmit power, perform power reduction for an uplink MIMO channel on which a main data transmission block and a secondary data transmission block are sent, so that the total transmit power of the UE after the reduction is less than or equal to the maximum allowed transmit power.

The power reduction unit 701 may include: a first power reduction module 6011, a second power reduction module 6012, and a third power reduction module 6013. For composition content of the first power reduction module 6011, the second power reduction module 6012, the third power reduction module 6013, refer to the embodiment shown in FIG. 6 and no further details are provided herein.

In a boosting scenario using an E-DPCCH, the power reduction unit 701 may further include:

a first power keeping module 6014 and a second power keeping module 6015. For composition content of the first power keeping module 6014 and the second power keeping module 6015, refer to the embodiment shown in FIG. 6 and no further details are provided herein.

In this embodiment of the present invention, after the power reduction performed by the first power reduction module 6011, the second power reduction module 6012, the third power reduction module 6013, the first power keeping module 6014, and the second power keeping module 6015, if the total transmit power of the UE is still greater than the maximum allowed transmit power, the power reduction unit 701 may further include:

a sixth power reduction module 7011, configured to: after the third power reduction module 6013 performs second quantization for second gain factors $\beta_{ed,k,reduced}$ to obtain fourth gain factors $\beta_{ed,k,min}$ of N E-DPDCHs to which the main data transmission block and the secondary data transmission block each correspond and if the fourth gain factors $\beta_{ed,k,min}$ meet the condition that $\beta_{ed,k,min}/\beta_c=\min(\beta_{ed,k,reduced,min}/\beta_c, \beta_{ed,k,original}/\beta_c)$, perform additional scaling for the uplink MIMO channel on which the main data transmission block and the secondary data transmission block are sent, so as to meet the condition that the total transmit power of the UE after the reduction is less than or equal to the maximum allowed transmit power, where $\beta_c$ is a gain factor of a DPCCH, $\beta_{ed,k,original}$ indicates gain factors of the N E-DPDCHs to which the main data transmission block and the secondary data transmission block each correspond before the reduction, $\beta_{ed,k,reduced,min}$ is a minimum value of gain factors of the N E-DPDCHs configured by the network side, and k={1, ..., N}.

The sixth power reduction module 7011 may include:

a second power reduction submodule 70111, configured to reduce the gain factor of the DPCCH; and a second power keeping submodule 70112, configured to keep a power ratio between the DPCCH and an HS-DPCCH unchanged, keep a power ratio between the DPCCH and the E-DPCCH that corresponds to the main data transmission block unchanged, keep a power ratio between the DPCCH and an S-DPCCH unchanged, and keep power ratios $\beta_{ed,k,min}/\beta_c$ between each of the N E-DPDCHs to which the main data transmission block and the secondary data transmission block each correspond and the DPCCH unchanged, where k={1, ..., N}.

The foregoing content describes only composition content and structure relationships of each unit module. For details on execution methods of each unit module, refer to the embodiment shown in FIG. 3 and no further details are provided herein.

In this embodiment of the present invention, when total transmit power of a UE is greater than maximum allowed transmit power, a power reduction unit 701 performs power reduction for an uplink MIMO channel on which a main data transmission block and a secondary data transmission block are sent, so that the total transmit power after the reduction is less than or equal to the maximum allowed transmit power, thereby supporting an uplink MIMO application scenario and implementing control of the transmit power of the UE. In addition, because the main data transmission block and the secondary data transmission block are reduced simultaneously, a certain degree of equity can be ensured.

Figure 8:
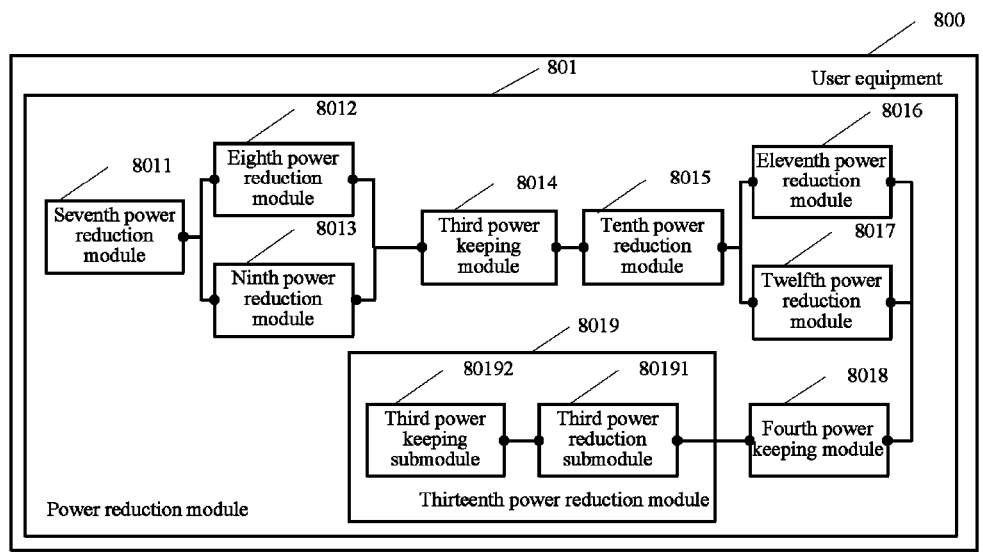
FIG. 8 is a schematic diagram of another user equipment according to an embodiment of the present invention.

The following describes a user equipment provided in an embodiment of the present invention by using another specific embodiment. As shown in FIG. 8, a user equipment 800 includes:

a power reduction unit 801, configured to: when total transmit power of a UE is greater than maximum allowed transmit power, perform power reduction for an uplink MIMO channel on which a main data transmission block and a secondary data transmission block are sent, so that the total transmit power of the UE after the reduction is less than or equal to the maximum allowed transmit power.

The power reduction unit 801 may include:

a seventh power reduction module 8011, configured to reduce first gain factors $\beta_{ed,k}$ of N E-DPDCHs corresponding to the secondary data transmission block to second gain factors $\beta_{ed,k,reduced}$ of the N E-DPDCHs corresponding to the secondary data transmission block, so as to meet the condition that the total transmit power of the UE after the reduction is less than or equal to the maximum allowed transmit power, where $k=\{1, \ldots, N\}$;

an eighth power reduction module 8012, configured to: if $\beta_{ed,k,reduced}/\beta_c$ is greater than or equal to $\beta_{ed,k,reduced,min}/\beta_c$, perform first quantization for the second gain factors $\beta_{ed,k,reduced}$ to obtain third gain factors $\beta_{ed,k,q}$ of the N E-DPDCHs corresponding to the secondary data transmission block, where $\beta_c$ is a gain factor of a DPCCH, $\beta_{ed,k,reduced,min}$ is a minimum value of gain factors of the N E-DPDCHs configured by a network side, and $k=\{1, \ldots, N\}$; and a ninth power reduction module 8013, configured to: if $\beta_{ed,k,reduced}/\beta_c$ is less than $\beta_{ed,k,reduced,min}/\beta_c$, perform second quantization for the second gain factors $\beta_{ed,k,reduced}$ to obtain fourth gain factors $\beta_{ed,k,min}$ of the N E-DPDCHs corresponding to the secondary data transmission block, where $\beta_c$ is the gain factor of the DPCCH, $\beta_{ed,k,min}/\beta_c=\min(\beta_{ed,k,reduced,min}/\beta_c, \beta_{ed,k,original}/\beta_c)$, $\beta_{ed,k,original}$ indicates gain factors of the N E-DPDCHs corresponding to the secondary data transmission block before the reduction, $\beta_{ed,k,reduced,min}$ is the minimum value of the gain factors of the N E-DPDCHs configured by the network side, and $k=\{1, \ldots, N\}$.

In a boosting scenario using an E-DPCCH, the power reduction unit 801 may further include:

a third power keeping module 8014, configured to: if an E-TFCI of the secondary data transmission block is greater than an E-TFCI$_{ec,boost}$ in the boosting scenario using the E-DPCCH, keep a gain factor of an E-DPCCH corresponding to the secondary data transmission block unchanged.

In this embodiment of the present invention, after the power reduction performed by the seventh power reduction module 8011, the eighth power reduction module 8012, the ninth power reduction module 8013, and the third power keeping module 8014, if the total transmit power of the UE is still greater than the maximum allowed transmit power, the power reduction unit 801 may further include:

a tenth power reduction module 8015, configured to: after the eighth power reduction module 8012 performs the first quantization for the second gain factors $\beta_{ed,k,reduced}$ to obtain the third gain factors $\beta_{ed,k,q}$ of the N E-DPDCHs corresponding to the secondary data transmission block or the ninth power reduction module 8013 performs the second quantization for the second gain factors $\beta_{ed,k,reduced}$ to obtain the fourth gain factors $\beta_{ed,k,min}$ of the N E-DPDCHs corresponding to the secondary data transmission block, reduce the first gain factors $\beta_{ed,k}$ of N E-DPDCHs corresponding to the main data transmission block to the second gain factors $\beta_{ed,k,reduced}$ of the N E-DPDCHs corresponding to the main data transmission block, so as to meet the condition that the total transmit power of the UE after the reduction is less than or equal to the maximum allowed transmit power, where $k=\{1, \ldots, N\}$;

an eleventh power reduction module 8016, configured to: if $\beta_{ed,k,reduced}/\beta_c$ is greater than or equal to $\beta_{ed,k,reduced,min}/\beta_c$, perform the first quantization for the second gain factors $\beta_{ed,k,reduced}$ to obtain third gain factors $\beta_{ed,k,q}$ of the N E-DPDCHs corresponding to the main data transmission block, where $\beta_c$ is a gain factor of a DPCCH, $\beta_{ed,k,reduced,min}$ is a minimum value of gain factors of the N E-DPDCHs configured by a network side, and $k=\{1, \ldots, N\}$; and a twelfth power reduction module 8017, configured to: if $\beta_{ed,k,reduced}/\beta_c$ is less than $\beta_{ed,k,reduced,min}/\beta_c$, perform the second quantization for the second gain factors $\beta_{ed,k,reduced}$ to obtain fourth gain factors $\beta_{ed,k,min}$ of the N E-DPDCHs corresponding to the main data transmission block, where $\beta_c$ is the gain factor of the DPCCH, $\beta_{ed,k,min}/\beta_c=\min(\beta_{ed,k,reduced,min}/\beta_c, \beta_{ed,k,original}/\beta_c)$, $\beta_{ed,k,original}$ indicates gain factors of the N E-DPDCHs corresponding to the main data transmission block before the reduction, $\beta_{ed,k,reduced,min}$ is the minimum value of the gain factors of the N E-DPDCHs configured by the network side, and $k=\{1, \ldots, N\}$.

In the boosting scenario using the E-DPCCH, the power reduction unit 801 may further include:

a fourth power keeping module 8018, configured to: if an E-TFCI of the main data transmission block is greater than an E-TFCI$_{ec,boost}$ in the boosting scenario using the E-DPCCH, keep a gain factor of an E-DPCCH corresponding to the main data transmission block unchanged.

In this embodiment of the present invention, after the power reduction performed by the tenth power reduction module 8015, the eleventh power reduction module 8016, the twelfth power reduction module 8017, and the fourth power keeping module 8018, if the total transmit power of the UE is still greater than the maximum allowed transmit power, the power reduction unit 801 may further include:

a thirteenth power reduction module 8019, configured to: after the eleventh power reduction module 8016 performs the first quantization for the second gain factors $\beta_{ed,k,reduced}$ to obtain the third gain factors $\beta_{ed,k,q}$ of the N E-DPDCHs corresponding to the main data transmission block or the twelfth power reduction module performs the second quantization for the second gain factors $\beta_{ed,k,reduced}$ to obtain the fourth gain factors $\beta_{ed,k,min}$ of the N E-DPDCHs corresponding to the main data transmission block, if all the fourth gain factors $\beta_{ed,k,min}$ of the N E-DPDCHs to which the main data transmission block and the secondary data transmission block each correspond meet the condition that $\beta_{ed,k,min}/\beta_c=\min(\beta_{ed,k,reduced,min}/\beta_c, \beta_{ed,k,original}/\beta_c)$, perform additional scaling for the uplink MIMO channel on which the main data transmission block and the secondary data transmission block are sent, so as to meet the condition that the total transmit power of the UE after the reduction is less than or equal to the maximum allowed transmit power, where $\beta_c$ is the gain factor of the DPCCH, $\beta_{ed,k,original}$ indicates the gain factors of the N E-DPDCHs to which the main data transmission block and the secondary data transmission block each correspond before the reduction, $\beta_{ed,k,reduced,min}$ is the minimum value of the gain factors of the N E-DPDCHs configured by the network side, and k={1, ..., N}.

The thirteenth power reduction module 8019 may include:
a third power reduction submodule 80191, configured to reduce the gain factor of the DPCCH; and
a third power keeping submodule 80192, configured to keep a power ratio between the DPCCH and an HS-DPCCH unchanged, keep a power ratio between the DPCCH and the E-DPCCH that corresponds to the main data transmission block unchanged, keep a power ratio between the DPCCH and an S-DPCCH unchanged, and keep power ratios $\beta_{ed,k,min}/\beta_c$ between each of N E-DPDCHs to which the main data transmission block and the secondary data transmission block each correspond and the DPCCH unchanged, where k={1, ..., N}.

The foregoing content describes only composition content and structure relationships of each unit module. For details on execution methods of each unit module, refer to the embodiment shown in FIG. 4 and no further details are provided herein.

In this embodiment of the present invention, when total transmit power of a UE is greater than maximum allowed transmit power, a power reduction unit 801 performs power reduction for an uplink MIMO channel on which a secondary data transmission block and a main data transmission block are sent, so that the total transmit power after the reduction is less than or equal to the maximum allowed transmit power, thereby supporting an uplink MIMO application scenario and implementing control of the transmit power of the UE. In addition, because power reduction is first performed for the secondary data transmission block, normal sending performance of the main data transmission block can be ensured.

Figure 9:
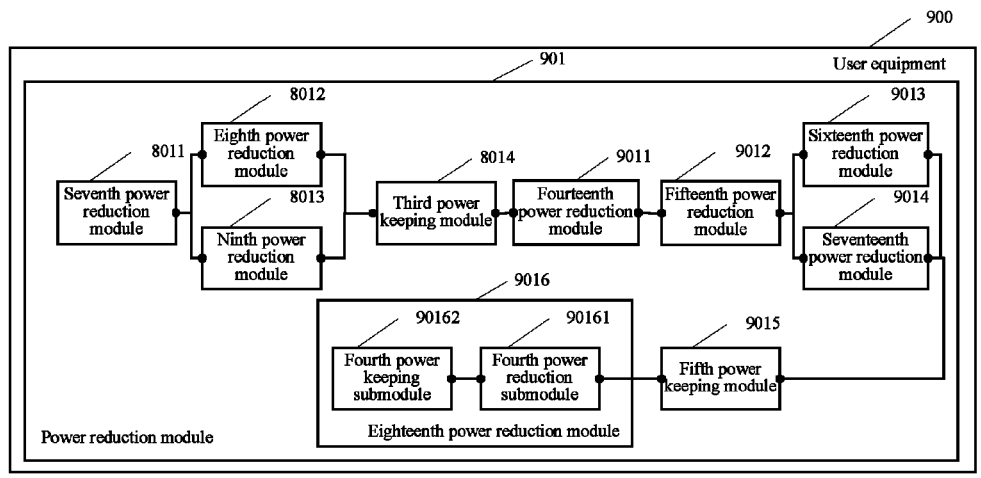
FIG. 9 is a schematic diagram of another user equipment according to an embodiment of the present invention.

The following describes a user equipment provided in an embodiment of the present invention by using another specific embodiment. As shown in FIG. 9, a user equipment 900 includes:

a power reduction unit 901, configured to: when total transmit power of a UE is greater than maximum allowed transmit power, perform power reduction for an uplink MIMO channel on which a main data transmission block and a secondary data transmission block are sent, so that the total transmit power of the UE after the reduction is less than or equal to the maximum allowed transmit power.

The power reduction unit 901 may include: a seventh power reduction module 8011, an eighth power reduction module 8012, a ninth power reduction module 8013, and a third power keeping module 8014. For composition content of the seventh power reduction module 8011, the eighth power reduction module 8012, the ninth power reduction module 8013, and the third power keeping module 8014, refer to the embodiment shown in FIG. 8 and no further details are provided herein.

In this embodiment of the present invention, after the power reduction performed by the seventh power reduction module 8011, the eighth power reduction module 8012, the ninth power reduction module 8013, and the third power keeping module 8014, if the total transmit power of the UE is still greater than the maximum allowed transmit power, the power reduction unit 901 may further include:

a fourteenth power reduction module 9011, configured to: after the ninth power reduction module 8013 performs the second quantization for the second gain factors $\beta_{ed,k,reduced}$ to obtain the fourth gain factors $\beta_{ed,k,min}$ of the N E-DPDCHs corresponding to the secondary data transmission block, perform DTX for the N E-DPDCHs and the E-DPCCH that correspond to the secondary data transmission block.

After the power reduction performed by the fourteenth power reduction module 9011, if the total transmit power of the UE is still greater than the maximum allowed transmit power, the power reduction unit 901 may further includes:

a fifteenth power reduction module 9012, configured to: after the fourteenth power reduction module 9011 performs the DTX for the N E-DPDCHs and the E-DPCCH that correspond to the secondary data transmission block, reduce first gain factors $\beta_{ed,k}$ of the N E-DPDCHs corresponding to the main data transmission block to the second gain factors $\beta_{ed,k,reduced}$ of the N E-DPDCHs corresponding to the main data transmission block, so as to meet the condition that the total transmit power of the UE after the reduction is less than or equal to the maximum allowed transmit power, where k={1, ..., N};

a sixteenth power reduction module 9013, configured to: if $\beta_{ed,k,reduced}/\beta_c$ is greater than or equal to $\beta_{ed,k,reduced,min}/\beta_c$, perform the first quantization for the second gain factors $\beta_{ed,k,reduced}$ to obtain third gain factors $\beta_{ed,k,q}$ of the N E-DPDCHs corresponding to the main data transmission block, where $\beta_c$ is a gain factor of a DPCCH, $\beta_{ed,k,reduced,min}$ is a minimum value of gain factors of the N E-DPDCHs configured by a network side, and k={1, ..., N};

a seventeenth power reduction module 9014, configured to: if $\beta_{ed,k,reduced}/\beta_c$ is less than $\beta_{ed,k,reduced,min}/\beta_c$, perform the second quantization for the second gain factors $\beta_{ed,k,reduced}$ to obtain fourth gain factors $\beta_{ed,k,min}$ of the N E-DPDCHs corresponding to the main data transmission block, where $\beta_c$ is the gain factor of the DPCCH, $\beta_{ed,k,min}/\beta_c=\min(\beta_{ed,k,reduced,min}/\beta_c, \beta_{ed,k,original}/\beta_c)$, $\beta_{ed,k,original}$ indicates gain factors of the N E-DPDCHs corresponding to the main data transmission block before the reduction, $\beta_{ed,k,reduced,min}$ is the minimum value of the gain factors of the N E-DPDCHs configured by the network side, and k={1, ..., N}; and a fifth power keeping module 9015, configured to: after the sixteenth power reduction module 9013 performs the first quantization for the second gain factors $\beta_{ed,k,reduced}$ to obtain the third gain factors $\beta_{ed,k,q}$ of the N E-DPDCHs corresponding to the main data transmission block or the seventeenth power reduction module 9014 performs the second quantization for the second gain factors $\beta_{ed,k,reduced}$ to obtain the fourth gain factors $\beta_{ed,k,min}$ of the N E-DPDCHs corresponding to the main data transmission block, if an E-TFCI of the main data transmission block is greater than an $E\text{-}TFCI_{ec,boost}$ in a boosting scenario using the E-DPCCH, keep the gain factor of the E-DPCCH corresponding to the main data transmission block unchanged.

In this embodiment of the present invention, after the power reduction performed by the fifteenth power reduction module 9012, the sixteenth power reduction module 9013, the seventeenth power reduction module 9014, and the fifth power keeping module 9015, if the total transmit power of the UE is still greater than the maximum allowed transmit power, the power reduction unit 901 may further include:

an eighteenth power reduction module 9016, configured to: after the sixteenth power reduction module 9013 performs the first quantization for the second gain factors $\beta_{ed,k,reduced}$ to obtain the third gain factors $\beta_{ed,k,q}$ of the N E-DPDCHs corresponding to the main data transmission block or the seventeenth power reduction module 9014 performs the second quantization for the second gain factors $\beta_{ed,k,reduced}$ to obtain the fourth gain factors $\beta_{ed,k,min}$ of the N E-DPDCHs corresponding to the main data transmission block, if the fourth gain factors $\beta_{ed,k,min}$ of the N E-DPDCHs corresponding to the main data transmission block meet the condition that $\beta_{ed,k,min}/\beta_c=\min(\beta_{ed,k,reduced,min}/\beta_c, \beta_{ed,k,original}/\beta_c)$ and the UE performs the DTX for the N E-DPDCHs and the E-DPCCH that correspond to the secondary data transmission block, perform additional scaling for the uplink MIMO channel on which the main data transmission block and the secondary data transmission block are sent, so as to meet the condition that the total transmit power of the UE after the reduction is less than or equal to the maximum allowed transmit power, where $\beta_c$ is the gain factor of the DPCCH, $\beta_{ed,k,original}$ indicates the gain factors of the N E-DPDCHs corresponding to the main data transmission block before the reduction, $\beta_{ed,k,reduced,min}$ is the minimum value of the gain factors of the N E-DPDCHs configured by the network side, and k={1, ..., N}.

The eighteenth power reduction module 9016 may include:
a fourth power reduction submodule 90161, configured to reduce the gain factor of the DPCCH; and
a fourth power keeping submodule 90162, configured to keep a power ratio between the DPCCH and an HS-DPCCH unchanged, keep a power ratio between the DPCCH and the E-DPCCH that corresponds to the main data transmission block unchanged, keep a power ratio between the DPCCH and an S-DPCCH unchanged, and keep power ratios $\beta_{ed,k,min}/\beta_c$ between each of N E-DPDCHs corresponding to the main data transmission block and the DPCCH unchanged, where k={1, ..., N}.

In this embodiment of the present invention, when total transmit power of a UE is greater than maximum allowed transmit power, a power reduction unit 901 performs power reduction for an uplink MIMO channel on which a secondary data transmission block and a main data transmission block are sent, so that the total transmit power after the reduction is less than or equal to the maximum allowed transmit power, thereby supporting an uplink MIMO application scenario and implementing control of the transmit power of the UE. In addition, because power reduction is first performed for the secondary data transmission block, normal sending performance of the main data transmission block can be ensured.

A person of ordinary skill in the art may understand that all or a part of the steps of the foregoing method embodiments may be implemented by a program instructing relevant hardware. The program may be stored in a computer readable storage medium. The storage medium may be a read-only memory, a magnetic disk, or an optical disc or the like.

The foregoing describes in detail a method for controlling power of an uplink multiple-input multiple-output channel, and a user equipment provided in the present invention. A person of ordinary skill in the art may make modifications to the specific implementation manners and application scopes according to the idea of embodiments of the present invention. In conclusion, the content of this specification should not be construed as a limitation to the present invention.

What is claimed is:

1. A method for controlling power of an uplink multiple-input multiple-output channel, comprising:
   sending a main data transmission block and a secondary data transmission block on an uplink multiple-input multiple-output MIMO channel;
   performing, by a user equipment UE, power reduction for the uplink multiple-input multiple-output MIMO channel when total transmit power of the UE is greater than maximum allowed transmit power; and
   reducing the total transmit power of the UE to less than or equal to the maximum allowed transmit power,
   wherein the performing, by the UE, power reduction for an uplink MIMO channel on which a main data transmission block and a secondary data transmission block are sent, comprises:
   reducing, by the UE, first gain factors $\beta_{ed,k}$ of N enhanced dedicated channel dedicated physical data channels E-DPDCHs to which the main data transmission block and the secondary data transmission block each correspond to second gain factors $\beta_{ed,k,reduced}$ of the N E-DPDCHs to which the main data transmission block and the secondary data transmission block each correspond, so as to meet the condition that the total transmit power of the UE is less than or equal to the maximum allowed transmit power, wherein k={1, ..., N};
   if $\beta_{ed,k,reduced}/\beta_c$ is greater than or equal to $\beta_{ed,k,reduced,min}/\beta_c$, performing, by the UE, first quantization for the second gain factors $\beta_{ed,k,reduced}$ to obtain third gain factors $\beta_{ed,k,q}$ of the N E-DPDCHs to which the main data transmission block and the secondary data transmission block each correspond, wherein $\beta_c$ is a gain factor of a dedicated physical control channel DPCCH, $\beta_{ed,k,reduced,min}$ is a minimum value of gain factors of the N E-DPDCHs configured by a network side, and k={1, ..., N}; and
   if $\beta_{ed,k,reduced}/\beta_c$ is less than $\beta_{ed,k,reduced,min}/\beta_c$, performing, by the UE, second quantization for the second gain factors $\beta_{ed,k,reduced}$ to obtain fourth gain factors $\beta_{ed,k,min}$ of the N E-DPDCHs to which the main data transmission block and the secondary data transmission block each correspond, wherein $\beta_c$ is the gain factor of the DPCCH, $\beta_{ed,k,min}/\beta_c=\min(\beta_{ed,k,reduced,min}/\beta_c, \beta_{ed,k,original}/\beta_c)$, $\beta_{ed,k,original}$ indicates gain factors of the N E-DPDCHs to which the main data transmission block and the secondary data transmission block each correspond before the reduction, $\beta_{ed,k,reduced,min}$ is the minimum value of the gain factors of the N E-DPDCHs configured by the network side, and k={1, ..., N}.

2. The method for controlling power of an uplink multiple-input multiple-output channel according to claim 1, after the performing, by the UE, second quantization for the second gain factors $\beta_{ed,k,reduced}$ to obtain fourth gain factors $\beta_{ed,k,min}$ of the N E-DPDCHs to which the main data transmission block and the secondary data transmission block each correspond, comprising:
   performing, by the UE, discontinuous transmission DTX for the N E-DPDCHs and the E-DPCCH that correspond to the secondary data transmission block.

3. The method for controlling power of an uplink multiple-input multiple-output channel according to claim 2, after the performing, by the UE, DTX for the N E-DPDCHs and the E-DPCCH that correspond to the secondary data transmission block, comprising:
   performing, by the UE, additional scaling for the uplink MIMO channel on which the main data transmission block and the secondary data transmission block are sent, so as to meet the condition that the total transmit power of the UE after the reduction is less than or equal to the maximum allowed transmit power, wherein:
   the performing, by the UE, additional scaling for the uplink MIMO channel on which the main data transmission block and the secondary data transmission block are sent, comprises:
   reducing, by the UE, the gain factor of the DPCCH, keeping a power ratio between the DPCCH and a dedicated physical control channel for high speed downlink shared channel HS-DPCCH unchanged, keeping a power ratio between the DPCCH and the E-DPCCH that corresponds to the main data transmission block unchanged, keeping a power ratio between the DPCCH and a secondary dedicated physical control channel S-DPCCH unchanged, and keeping power ratios $\beta_{ed,k,min}/\beta_c$ between each of N E-DPDCHs corresponding to the main data transmission block and the DPCCH unchanged, wherein k={1, ..., N}.

4. The method for controlling power of an uplink multiple-input multiple-output channel according to claim 1, after the performing, by the UE, second quantization for the second gain factors $\beta_{ed,k,reduced}$ to obtain fourth gain factors $\beta_{ed,k,min}$ of the N E-DPDCHs to which the main data transmission block and the secondary data transmission block each correspond, comprising:

if the fourth gain factors $\beta_{ed,k,min}$ meet the condition that $\beta_{ed,k,min}/\beta_c=\min\ (\beta_{ed,k,reduced,min}/\beta_c,\ \beta_{ed,k,original}/\beta_c)$, performing, by the UE, additional scaling for the uplink MIMO channel on which the main data transmission block and the secondary data transmission block are sent, so as to meet the condition that the total transmit power of the UE after the reduction is less than or equal to the maximum allowed transmit power, wherein $\beta_c$ is the gain factor of the DPCCH, $\beta_{ed,k,original}$ indicates the gain factors of the N E-DPDCHs to which the main data transmission block and the secondary data transmission block each correspond before the reduction, $\beta_{ed,k,reduced,min}$ is the minimum value of the gain factors of the N E-DPDCHs configured by the network side, and k={1, ..., N}, wherein:

the performing, by the UE, additional scaling for the uplink MIMO channel on which the main data transmission block and the secondary data transmission block are sent, comprises:

reducing, by the UE, the gain factor of the DPCCH, keeping a power ratio between the DPCCH and an HS-DPCCH unchanged, keeping a power ratio between the DPCCH and the E-DPCCH that corresponds to the main data transmission block unchanged, keeping a power ratio between the DPCCH and an S-DPCCH unchanged, and keeping power ratios $\beta_{ed,k,min}/\beta_c$ between each of the N E-DPDCHs to which the main data transmission block and the secondary data transmission block each correspond and the DPCCH unchanged, wherein k={1, ..., N}.

5. A user equipment comprising:
a power reduction unit, configured to:
send a main data transmission block and a secondary data transmission block on an uplink multiple-input multiple-output MIMO channel;
perform, by the user equipment UE, power reduction for the uplink multiple-input multiple-output MIMO channel when total transmit power of the UE is greater than maximum allowed transmit power; and
reduce the total transmit power of the UE to less than or equal to the maximum allowed transmit power, wherein the power reduction unit comprises:
a first power reduction module, configured to reduce first gain factors $\beta_{ed,k}$ of N enhanced dedicated channel dedicated physical data channel E-DPDCHs to which the main data transmission block and the secondary data transmission block each correspond to second gain factors $\beta_{ed,k,reduced}$ of the N E-DPDCHs to which the main data transmission block and the secondary data transmission block each correspond, so as to meet the condition that the total transmit power of the UE is less than or equal to the maximum allowed transmit power, wherein k={1, ..., N};

a second power reduction module, configured to:
if $\epsilon_{ed,k,reduced}/\beta_c$ is greater than or equal to $\beta_{ed,k,reduced,min}/\beta_c$, perform first quantization for the second gain factors $\beta_{ed,k,reduced}$ to obtain third gain factors $\beta_{ed,k,q}$ of the N E-DPDCHs to which the main data transmission block and the secondary data transmission block each correspond, wherein $\beta_c$ is a gain factor of a dedicated physical control channel DPCCH, $\beta_{ed,k,reduced,min}$ is a minimum value of gain factors of the N E-DPDCHs configured by a network side, and k={1, ..., N}; and a third power reduction module, configured to: if $\beta_{ed,k,reduced}/\beta_c$ is less than $\beta_{ed,k,reduced,min}/\beta_c$, perform second quantization for the second gain factors $\beta_{ed,k,reduced}$ to obtain fourth gain factors $\beta_{ed,k,min}$ of the N E-DPDCHs to which the main data transmission block and the secondary data transmission block each correspond, wherein $\beta_c$ is the gain factor of the DPCCH, $\beta_{ed,k,min}/\beta_c=\min\ (\beta_{ed,k,reduced,min}/\beta_c,\ \beta_{ed,k,original}/\beta_c)$, $\beta_{ed,k,original}$ indicates gain factors of the N E-DPDCHs to which the main data transmission block and the secondary data transmission block each correspond before the reduction, $\beta_{ed,k,reduced,min}$ is the minimum value of the gain factors of the N E-DPDCHs configured by the network side, and k={1, ..., N}.

6. The user equipment according to claim 5, wherein the power reduction unit further comprises:
a fourth power reduction module, configured to: after the third power reduction module performs the second quantization for the second gain factors $\beta_{ed,k,reduced}$ to obtain the fourth gain factors $\beta_{ed,k,min}$ of the N E-DPDCHs to which the main data transmission block and the secondary data transmission block each correspond, perform discontinuous transmission DTX for the N E-DPDCHs and the E-DPCCH that correspond to the secondary data transmission block.

7. The user equipment according to claim 6, wherein the power reduction unit further comprises:
a fifth power reduction module, configured to: after the fourth power reduction module performs the DTX for the N E-DPDCHs and the E-DPCCH that correspond to the secondary data transmission block, perform additional scaling for the uplink MIMO channel on which the main data transmission block and the secondary data transmission block are sent, so as to meet the condition that the total transmit power of the UE after the reduction is less than or equal to the maximum allowed transmit power; and
the fifth power reduction module comprises:
a first power reduction submodule, configured to reduce the gain factor of the DPCCH; and
a first power keeping submodule, configured to keep a power ratio between the DPCCH and a dedicated physical control channel for high speed downlink shared channel HS-DPCCH unchanged, keep a power ratio between the DPCCH and the E-DPCCH that corresponds to the main data transmission block unchanged, keep a power ratio between the DPCCH and a secondary dedicated physical control channel S-DPCCH unchanged, and keep power ratios $\beta_{ed,k,min}/\beta_c$ between each of N E-DPDCHs corresponding to the main data transmission block and the DPCCH unchanged, wherein k={1, ..., N}.

8. The user equipment according to claim 5, wherein the power reduction unit further comprises:
a sixth power reduction module, configured to: after the third power reduction module performs the second quantization for second gain factors $\beta_{ed,k,reduced}$ to obtain the fourth gain factors $\beta_{ed,k,min}$ of the N E-DP-DCHs to which the main data transmission block and the secondary data transmission block each correspond and if the fourth gain factors $\beta_{ed,k,min}$ meet the condition that $\beta_{ed,k,min}/\beta_c=\min\ (\beta_{ed,k,reduced,min}/\beta_c,\ \beta_{ed,k,original}/\beta_c)$, perform additional scaling for the uplink MIMO channel on which the main data transmission block and the secondary data transmission block are sent, so as to meet the condition that the total transmit power of the UE after the reduction is less than or equal to the maximum allowed transmit power, wherein $\beta_c$ is the gain factor of the DPCCH, $\beta_{ed,k,original}$ indicates the gain factors of the N DPDCHs to which the main data transmission block and the secondary data transmission block each correspond before the reduction, $\beta_{ed,k,reduced,min}$ is the minimum value of the gain factors of the N E-DPDCHs configured by the network side, and $k=\{1, \ldots, N\}$; and the sixth power reduction module comprises:

a second power reduction submodule, configured to reduce the gain factor of the DPCCH; and a second power keeping submodule, configured to keep a power ratio between the DPCCH and an HS-DPCCH unchanged, keep a power ratio between the DPCCH and the E-DPCCH that corresponds to the main data transmission block unchanged, keep a power ratio between the DPCCH and an S-DPCCH unchanged, and keep power ratios $\beta_{ed,k,min}/\beta_c$ between each of the N E-DPDCHs to which the main data transmission block and the secondary data transmission block each correspond and the DPCCH unchanged, wherein $k=\{1, \ldots, N\}$.

9. A user equipment, comprising:

a memory; and a processor coupled to the memory and configured to:

send a main data transmission block and a secondary data transmission block on an uplink multiple-input multiple-output MIMO channel;

perform, by the user equipment UE, power reduction for the uplink multiple-input multiple-output MIMO channel when total transmit power of the UE is greater than maximum allowed transmit power; and reduce the total transmit power of the UE to less than or equal to the maximum allowed transmit power, wherein the processor is configured to:

reduce first gain factors $\beta_{ed,k}$ of N enhanced dedicated channel dedicated physical data channel E-DPDCHs to which the main data transmission block and the secondary data transmission block each correspond to second gain factors $\beta_{ed,k,reduced}$ of the N E-DPDCHs to which the main data transmission block and the secondary data transmission block each correspond, so as to meet the condition that the total transmit power of the UE is less than or equal to the maximum allowed transmit power, wherein $k=\{1, \ldots, N\}$;

if $\beta_{ed,k,reduced}/\beta_c$ is greater than or equal to $\beta_{ed,k,reduced,min}/\beta_c$, perform first quantization for the second gain factors $\beta_{ed,k,reduced}$ to obtain third gain factors $\beta_{ed,k,q}$ of the N E-DPDCHs to which the main data transmission block and the secondary data transmission block each correspond, wherein $\beta_c$ is a gain factor of a dedicated physical control channel DPCCH, $\beta_{ed,k,reduced,min}$ is a minimum value of gain factors of the N E-DPDCHs configured by a network side, and $k=\{1, \ldots, N\}$; and if $\beta_{ed,k,reduced}/\beta_c$ is less than $\beta_{ed,k,reduced,min}/\beta_c$, perform second quantization for the second gain factors $\beta_{ed,k,reduced}$ to obtain fourth gain factors $\beta_{ed,k,min}$ of the N E-DPDCHs to which the main data transmission block and the secondary data transmission block each correspond, wherein $\beta_c$ is the gain factor of the DPCCH, $\beta_{ed,k,min}/\beta_c=\min\ (\beta_{ed,k,reduced,min}/\beta_c,\ \beta_{ed,k,original}/\beta_c)$, $\beta_{ed,k,original}$ indicates gain factors of the N E-DPDCHs to which the main data transmission block and the secondary data transmission block each correspond before the reduction, $\beta_{ed,k,reduced,min}$ is the minimum value of the gain factors of the N E-DPDCHs configured by the network side, and $k=\{1, \ldots, N\}$.

10. The user equipment according to claim 9, wherein the processor is configured to:

after performing the second quantization for the second gain factors $\beta_{ed,k,reduced}$ to obtain the fourth gain factors $\beta_{ed,k,min}$ of the N E-DPDCHs to which the main data transmission block and the secondary data transmission block each correspond, perform discontinuous transmission DTX for the N E-DPDCHs and the E-DPCCH that correspond to the secondary data transmission block.

11. The user equipment according to claim 10, wherein the processor is configured to:

after performing the DTX for the N E-DPDCHs and the E-DPCCH that correspond to the secondary data transmission block, perform additional scaling for the uplink MIMO channel on which the main data transmission block and the secondary data transmission block are sent, so as to meet the condition that the total transmit power of the UE after the reduction is less than or equal to the maximum allowed transmit power, wherein the processor is configured to:

reduce the gain factor of the DPCCH; and keep a power ratio between the DPCCH and a dedicated physical control channel for high speed downlink shared channel HS-DPCCH unchanged, keep a power ratio between the DPCCH and the E-DPCCH that corresponds to the main data transmission block unchanged, keep a power ratio between the DPCCH and a secondary dedicated physical control channel S-DPCCH unchanged, and keep power ratios $\beta_{ed,k,min}/\beta_c$ between each of N E-DPDCHs corresponding to the main data transmission block and the DPCCH unchanged, wherein $k=\{1, \ldots, N\}$.

12. The user equipment according to claim 9, wherein the processor is configured to:

after performing the second quantization for second gain factors $\beta_{ed,k,reduced}$ to obtain the fourth gain factors $\beta_{ed,k,min}$ of the N E-DPDCHs to which the main data transmission block and the secondary data transmission block each correspond and if the fourth gain factors $\beta_{ed,k,min}$ meet the condition that $\beta_{ed,k,min}/\beta_c=\min\ (\beta_{ed,k,reduced,min}/\beta_c,\ \beta_{ed,k,original}/\beta_c)$, perform additional scaling for the uplink MIMO channel on which the main data transmission block and the secondary data transmission block are sent, so as to meet the condition that the total transmit power of the UE after the reduction is less than or equal to the maximum allowed transmit power, wherein $\beta_c$ is the gain factor of the DPCCH, $\beta_{ed,k,original}$ indicates the gain factors of the N DPDCHs to which the main data transmission block and the secondary data transmission block each correspond before the reduction, $\beta_{ed,k,reduced,min}$ is the minimum value of the gain factors of the N E-DPDCHs configured by the network side, and $k=\{1, \ldots, N\}$, wherein the processor is configured to:

reduce the gain factor of the DPCCH; and keep a power ratio between the DPCCH and an HS-DPCCH unchanged, keep a power ratio between the DPCCH and the E-DPCCH that corresponds to the main data transmission block unchanged, keep a power ratio between the DPCCH and an S-DPCCH unchanged, and keep power ratios $\beta_{ed,k,min}/\beta_c$ between each of the N E-DPDCHs to which the main data transmission block and the secondary data transmission block each correspond and the DPCCH unchanged, wherein k={1, ..., N}.

* * * * *